United States Patent
Fukushima et al.

(10) Patent No.: US 9,957,429 B2
(45) Date of Patent: *May 1, 2018

(54) COMPOSITION FOR HEAT CYCLE SYSTEM, AND HEAT CYCLE SYSTEM

(71) Applicant: ASAHI GLASS COMPANY, LIMITED, Chiyoda-ku (JP)

(72) Inventors: Masato Fukushima, Chiyoda-ku (JP); Hiroaki Mitsuoka, Chiyoda-ku (JP); Mai Tasaka, Chiyoda-ku (JP); Daisuke Shirakawa, Chiyoda-ku (JP); Hirokazu Takagi, Chiyoda-ku (JP); Takeaki Arai, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/218,521

(22) Filed: Jul. 25, 2016

(65) Prior Publication Data

US 2016/0333241 A1 Nov. 17, 2016

Related U.S. Application Data

(63) Continuation of application No. PCT/JP2015/054653, filed on Feb. 19, 2015.

(30) Foreign Application Priority Data

| Feb. 20, 2014 | (JP) | 2014-030857 |
| Jun. 20, 2014 | (JP) | 2014-127744 |
| Jul. 18, 2014 | (JP) | 2014-148347 |
| Sep. 12, 2014 | (JP) | 2014-187003 |

(51) Int. Cl.
| *C09K 5/04* | (2006.01) |
| *C10M 171/00* | (2006.01) |
| *C10M 171/02* | (2006.01) |
| *C10M 105/38* | (2006.01) |
| *C10M 107/24* | (2006.01) |
| *C10M 105/04* | (2006.01) |
| *F25B 13/00* | (2006.01) |

(52) U.S. Cl.
CPC ........... *C09K 5/045* (2013.01); *C10M 105/04* (2013.01); *C10M 105/38* (2013.01); *C10M 107/24* (2013.01); *C10M 171/00* (2013.01); *C10M 171/008* (2013.01); *C10M 171/02* (2013.01); *F25B 13/00* (2013.01); C09K 2205/126 (2013.01); C10M 2203/045 (2013.01); C10M 2203/1065 (2013.01); C10M 2207/2835 (2013.01); C10M 2209/043 (2013.01); C10N 2220/302 (2013.01); C10N 2230/02 (2013.01); C10N 2230/04 (2013.01); C10N 2230/10 (2013.01); C10N 2230/28 (2013.01); C10N 2240/30 (2013.01)

(58) Field of Classification Search
CPC .......... C09K 2205/00; C09K 2205/122; C09K 2205/34; C09K 2205/22; C09K 5/04; C09K 5/044; C09K 5/045
USPC .................................. 252/67, 68, 69; 62/529
See application file for complete search history.

(56) References Cited

U.S. PATENT DOCUMENTS

| 5,716,916 | A | 2/1998 | Shiokawa et al. | |
| 9,493,694 | B2* | 11/2016 | Kaneko | C09K 5/045 |
| 2010/0090156 | A1* | 4/2010 | Nappa | C09K 5/045 252/74 |
| 2010/0175421 | A1 | 7/2010 | Kaneko et al. | |
| 2011/0011123 | A1 | 1/2011 | Matsuura et al. | |
| 2011/0049414 | A1 | 3/2011 | Kaneko et al. | |
| 2012/0132848 | A1* | 5/2012 | Sawada | C09K 5/045 252/68 |
| 2013/0012420 | A1 | 1/2013 | Matsumoto | |
| 2014/0070132 | A1* | 3/2014 | Fukushima | F25B 9/002 252/67 |
| 2015/0337191 | A1* | 11/2015 | Fukushima | C09K 5/045 62/324.1 |
| 2015/0376486 | A1* | 12/2015 | Hashimoto | C09K 5/045 252/67 |

(Continued)

FOREIGN PATENT DOCUMENTS

| EP | 3 101 082 A1 | 12/2016 |
| JP | 10-30095 | 2/1998 |

(Continued)

OTHER PUBLICATIONS

International Search Report dated Mar. 24, 2015 in PCT/JP2015/054653, filed on Feb. 19, 2015.

(Continued)

*Primary Examiner* — Douglas J McGinty
(74) *Attorney, Agent, or Firm* — Oblon, McClelland, Maier & Neustadt, L.L.P.

(57) ABSTRACT

A composition for a heat cycle system having favorable lubricating properties is provided. A heat cycle system employing the composition is also provided. The composition contains a working fluid for heat cycle, which has a low global warming potential and can replace R410A. The working fluid contains an unsaturated fluorinated hydrocarbon compound having a specific structure and a refrigerant oil having a breakdown voltage of at least 25 kV, a hydroxy value of at most 0.1 mgKOH/g, and a minimum temperature on the high temperature side of the phase separation temperature from the working fluid of at least 35° C. and a maximum temperature on the low temperature side of at most −60° C.

15 Claims, 1 Drawing Sheet

(56) References Cited

U.S. PATENT DOCUMENTS

| | | | |
|---|---|---|---|
| 2016/0075927 A1* | 3/2016 | Fukushima | C09K 5/045 252/68 |
| 2016/0333241 A1* | 11/2016 | Fukushima | C09K 5/045 |
| 2016/0333242 A1* | 11/2016 | Fukushima | C09K 5/045 |
| 2016/0333244 A1* | 11/2016 | Fukushima | C09K 5/045 |
| 2016/0333245 A1* | 11/2016 | Fujii | C10M 171/00 |
| 2016/0340565 A1* | 11/2016 | Tasaka | C09K 5/045 |
| 2016/0347979 A1* | 12/2016 | Okamoto | C09K 5/045 |
| 2016/0347980 A1* | 12/2016 | Okamoto | C09K 5/045 |
| 2016/0347982 A1* | 12/2016 | Fukushima | C09K 5/045 |
| 2016/0355717 A1* | 12/2016 | Fukushima | C09K 5/045 |
| 2016/0355719 A1* | 12/2016 | Fukushima | C09K 5/045 |
| 2016/0369146 A1* | 12/2016 | Ueno | C09K 5/04 |

FOREIGN PATENT DOCUMENTS

| | | |
|---|---|---|
| JP | 2009-191212 | 8/2009 |
| JP | 2009-222032 | 10/2009 |
| WO | WO 2008/153106 A1 | 12/2008 |
| WO | WO 2010/029704 A1 | 3/2010 |
| WO | WO 2012/157764 A1 | 11/2012 |
| WO | WO 2012/157765 A1 | 11/2012 |
| WO | WO 2013/062058 A1 | 5/2013 |
| WO | WO 2013/115160 A1 | 8/2013 |
| WO | WO 2015/005290 A1 | 1/2015 |

OTHER PUBLICATIONS

Jokyu Hyojun Text Reito Kucho Gijutsu Reito Hen, Japan Society of Refrigerating and Air Conditioning Engineers, Jan. 20, 1998, 18 pages.

* cited by examiner

COMPOSITION FOR HEAT CYCLE SYSTEM, AND HEAT CYCLE SYSTEM

TECHNICAL FIELD

The present invention relates to a composition for a heat cycle system, and a heat cycle system employing the composition.

BACKGROUND ART

In this specification, abbreviated names of halogenated hydrocarbon compounds are described in brackets after the compound names, and in this specification, the abbreviated names are employed instead of the compound names as the case requires.

Heretofore, as a working fluid for a heat cycle system such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for a heat cycle system, a hydrofluorocarbon (HFC) which has less influence over the ozone layer, such as difluoromethane (HFC-32), tetrafluoroethane or pentafluoroethane (HFC-125) has been used, instead of CFCs and HCFCs. For example, R410A (a pseudoazeotropic mixture of HFC-32 and HFC-125 in a mass ratio of 1:1) is a refrigerant which has been widely used. However, it is pointed out that HFCs may cause global warming.

R410A has been widely used for a common air-conditioning apparatus such as a so-called package air-conditioner or room air-conditioner, due to its high refrigerating capacity. However, it has a global warming potential (GWP) of so high as 2,088, and accordingly development of a working fluid with low GWP has been desired. Further, development of a working fluid has been desired on the condition that R410A is simply replaced and existing apparatus will be used as they are.

In recent years, a hydrofluoroolefin (HFO) i.e. a HFC having a carbon-carbon double bond is expected, which is a working fluid having less influence over the ozone layer and having less influence over global warming, since the carbon-carbon double bond is likely to be decomposed by OH radicals in the air. In this specification, a saturated HFC will be referred to as a HFC and distinguished from a HFO unless otherwise specified. Further, a HFC may be referred to as a saturated hydrofluorocarbon in some cases.

As a working fluid employing a HFO, for example, Patent Document 1 discloses a technique relating to a working fluid using trifluoroethylene (HFO-1123) which has the above properties and with which excellent cycle performance will be obtained. Further, Patent Document 2 discloses a technique relating to a working fluid using 1,2-difluoroethylene (HFO-1132) which has the above properties and with which excellent cycle performance will be obtained. Patent Documents 1 and 2 also disclose an attempt to obtain a working fluid comprising HFO-1123 or HFO-1132 and various HFCs of HFOs in combination for the purpose of increasing the flame retardancy, cycle performance, etc. of the working fluid.

However, such a HFO is a compound having an unsaturated bond in its molecule and is a compound having a very short life in the air, and accordingly under conditions under which compression and heating are repeatedly carried out in a heat cycle, it is inferior in the stability to a saturated hydrofluorocarbon or hydrochlorofluorocarbon such as a conventional HFC or HCFC, and lubricating properties may be decreased in the heat cycle system.

Thus, a method for efficiently operating a heat cycle system employing a HFO as a working fluid, with maintained lubricity while excellent cycle performance of the HFO is sufficiently made use of.

PRIOR ART DOCUMENTS

Patent Documents

Patent Document 1: WO2012/157764
Patent Document 2: WO2012/157765

DISCLOSURE OF INVENTION

Technical Problem

The present invention has been made under these circumstances, and its object is to provide a composition for a heat cycle system comprising a HFO, with stable lubricity of the HFO, while the low global warming potential and excellent cycle performance of the HFO are sufficiently made use of, and a heat cycle system employing the composition, which has less influence over global warming and has high cycle performance, and in which the lubricity of the working fluid for heat cycle is improved.

Solution to Problem

The present invention provides a working fluid for heat cycle, a composition for a heat cycle system and a heat cycle system of the following [1] to [15].

[1] A composition for a heat cycle system comprising a working fluid for heat cycle containing at least one unsaturated fluorinated hydrocarbon compound selected from a compound having at least one carbon-carbon unsaturated bond in its molecule represented by the following formula (I), and a refrigerant oil having a breakdown voltage of at least 25 kV, having a hydroxy value of at most 0.1 mgKOH/g, and a minimum temperature on the high temperature side of the phase separation temperature from the working fluid for heat cycle of at least 35° C. and a maximum temperature on the low temperature side of at most −60° C.:

$$C_xF_yR_z \qquad (I)$$

wherein R is H or Cl, x is an integer of from 2 to 6, y is an integer of from 1 to 12, and z is an integer of from 0 to 11, provided that $2x \geq y+z \geq 2$.

[2] The composition for a heat cycle system according to [1], wherein the compound of the formula (I) wherein x is 2 or 3 is contained.

[3] The composition for a heat cycle system according to [2], wherein as the unsaturated fluorinated hydrocarbon compound, at least one member selected from the group consisting of trifluoroethylene, 2,3,3,3-tetrafluoropropene, 1,2-difluoroethylene, 2-fluoropropene, 1,1,2-trifluoropropene, (E)-1,2,3,3,3-pentafluoropropene, (Z)-1,2,3,3,3-pentafluoropropene, (E)-1,3,3,3-tetrafluoropropene, (Z)-1,3,3,3-tetrafluoropropene and 3,3,3-trifluoropropene is contained.

[4] The composition for a heat cycle system according to any one of [1] to [3], wherein the working fluid for heat cycle further contains a saturated fluorinated hydrocarbon compound.

[5] The composition for a heat cycle system according to [4], wherein as the saturated fluorinated hydrocarbon compound, at least one member selected from the group consisting of trifluoromethane, difluoromethane, difluoroethane, trifluoroethane, tetrafluoroethane, pentafluoroethane, trifluoroiodomethane, pentafluoropropane, hexafluoropropane, heptafluoropropane, pentafluorobutane and heptafluorocyclopentane is contained.

[6] The composition for a heat cycle system according to any one of [1] to [5], wherein as the unsaturated fluorinated hydrocarbon compound, trifluoroethylene is contained, and the content of trifluoroethylene is from 20 to 80 mass % per 100 mass % of the working fluid for heat cycle.

[7] The composition for a heat cycle system according to any one of [4] to [6], wherein as the saturated fluorinated hydrocarbon compound, difluoromethane is contained, and the content of difluoromethane is from 20 to 80 mass % per 100 mass % of the working fluid for heat cycle.

[8] The composition for a heat cycle system according to [4] or [5], wherein trifluoroethylene and 2,3,3,3-tetrafluoropropene are contained as the unsaturated fluorinated hydrocarbon compound, and difluoromethane is contained as the saturated fluorinated hydrocarbon compound, the proportion of the total amount of trifluoroethylene, 2,3,3,3-tetrafluoropropene and difluoromethane based on the entire amount of the working fluid for heat cycle is higher than 90 mass % and at most 100 mass %, and based on the total amount of trifluoroethylene, 2,3,3,3-tetrafluoropropene and difluoromethane, the proportion by the mass of trifluoroethylene is at least 10 mass % and less than 70 mass %, the proportion by the mass of 2,3,3,3-tetrafluoropropene is higher than 0 mass % and at most 50 mass %, and the proportion by the mass of difluoromethane is higher than 30 mass % and at most 75 mass %.

[9] The composition for a heat cycle system according to [4] or [5], wherein trifluoroethylene and 2,3,3,3-tetrafluoropropene are contained as the unsaturated fluorinated hydrocarbon compound, and difluoromethane is contained as the saturated fluorinated hydrocarbon compound, the proportion of the total amount of trifluoroethylene, 2,3,3,3-tetrafluoropropene and difluoromethane based on the entire amount of the working fluid for heat cycle is higher than 90 mass % and at most 100 mass %, based on the total amount of trifluoroethylene, 2,3,3,3-tetrafluoropropene and difluoromethane, the proportion by the mass of the total amount of trifluoroethylene and 2,3,3,3-tetrafluoropropene is at least 70 mass %, the proportion by the mass of trifluoroethylene is at least 30 mass % and at most 80 mass %, the proportion by the mass of 2,3,3,3-tetrafluoropropene is higher than 0 mass % and at most 40 mass %, and the proportion by the mass of difluoromethane is higher than 0 mass % and at most 30 mass %, and the ratio of trifluoroethylene to 2,3,3,3-tetrafluoropropene is at most 95/5.

[10] The composition for a heat cycle system according to any one of [1] to [9], wherein the refrigerant oil is at least one member selected from a polyol ester refrigerant oil and a polyvinyl ether refrigerant oil.

[11] The composition for a heat cycle system according to any one of [1] to [10], wherein the refrigerant oil has a kinematic viscosity at 40° C. of from 5 to 200 mm$^2$/s and a kinematic viscosity at 100° C. of from 1 to 100 mm$^2$/s.

[12] The composition for a heat cycle system according to any one of [1] to [11], wherein the refrigerant oil has an aniline point of at least −100° C. and at most 0° C.

[13] A heat cycle system, which employs the composition for a heat cycle system as defined in any one of [1] to [12].

[14] The heat cycle system according to [13], which is at least one member selected from a refrigerating apparatus, an air-conditioning apparatus, a power generation system, a heat transport apparatus and a secondary cooling machine.

[15] The heat cycle system according to [14], wherein the heat cycle system has a compression mechanism having a contact portion to be in contact with the composition for a heat cycle system, and the contact portion is composed of at least one member selected from an engineering plastic, an organic film and an inorganic film.

Advantageous Effects of Invention

According to the present invention, it is possible to provide a composition for a heat cycle system comprising an unsaturated fluorinated hydrocarbon compound, with more stable lubricity of a working fluid for heat cycle containing the unsaturated fluorinated hydrocarbon compound, while the low global warming potential and excellent cycle performance of the unsaturated fluorinated hydrocarbon compound are sufficiently made use of.

The heat cycle system of the present invention is a heat cycle system which has less influence over global warming and has high cycle performance, and in which the lubricating properties of the working fluid for heat cycle are improved.

DESCRIPTION OF EMBODIMENTS

Figure 1:
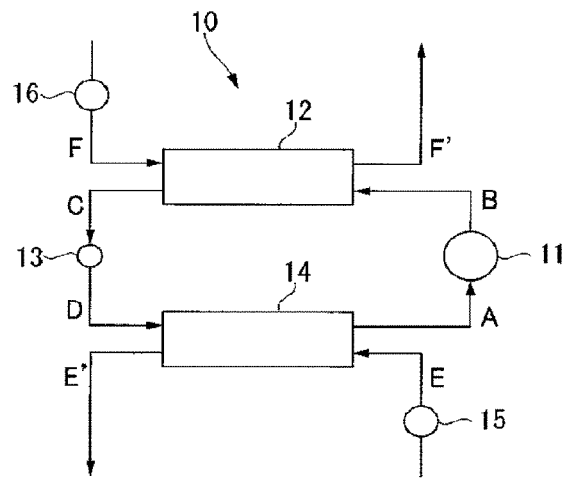
FIG. 1 is a schematic construction view illustrating a refrigerating cycle system as an example of a heat cycle system of the present invention.

Now, the present invention will be described in detail.

[Composition for Heat Cycle System]

The composition for a heat cycle system comprises a working fluid for heat cycle containing an unsaturated fluorinated hydrocarbon compound, and a refrigerant oil.

As a heat cycle system to which the composition of a heat cycle system of the present invention is applied, a heat cycle system by a heat exchanger such as a condenser or an evaporator may be used without any particular restriction. The heat cycle system, for example, a refrigerating cycle system, has a mechanism in which a gaseous working fluid is compressed by a compressor and cooled by a condenser to form a high pressure liquid, the pressure of the liquid is lowered by an expansion valve, and the liquid is vaporized at low temperature by an evaporator so that heat is removed by the heat of vaporization.

When an unsaturated fluorinated hydrocarbon compound is used as a working fluid for such a heat cycle system, depending upon the temperature conditions and the pressure conditions, the unsaturated fluorinated hydrocarbon compound may be destabilized and undergo self-decomposition, thus deteriorating the function of the working fluid for heat cycle. In the composition for a heat cycle system of the present invention, by the coexistence of a refrigerant oil, lubricity of the unsaturated fluorinated hydrocarbon compound as a working fluid for heat cycle is improved, whereby efficient cycle performance can be exhibited.

Now, components in the composition for a heat cycle system of the present invention will be described.

<Working Fluid>

The composition for a heat cycle system of the present invention contains, as a working fluid, at least one unsaturated fluorinated hydrocarbon compound selected from a compound having at least one carbon-carbon unsaturated bond in its molecule represented by the following formula (I):

wherein R is H or Cl, x is an integer of from 2 to 6, y is an integer of from 1 to 12, and z is an integer of from 0 to 11, provided that $2x \geq y+z \geq 2$.

The above formula (I) represents the types and the numbers of elements in the molecule, and the formula (I) represents a fluorinated organic compound in which the number x of carbon atoms C is from 2 to 6. A $C_{2-6}$ fluorinated organic compound can have physical and chemical properties required for a working fluid, such as the boiling point, the freezing point and the latent heat of vaporization.

In the formula (I), the form of bond of x carbon atoms represented by $C_x$ may be a carbon-carbon single bond, an unsaturated bond such as a carbon-carbon double bond, and the like, and the compound has at least one carbon-carbon unsaturated bond. The unsaturated bond such as a carbon-carbon double bond is preferably a carbon-carbon double bond in view of stability, and its number is preferably 1.

Further, in the formula (I), R is either H or Cl, and R is preferably H, whereby such a compound is less likely to destroy the ozone layer.

Further, in the formula (I), the range of y+z is preferably at least 4.

[Unsaturated Fluorinated Hydrocarbon Compound]

In the present invention, the unsaturated fluorinated hydrocarbon compound used as the working fluid for a heat cycle system may be a compound represented by the formula (I) and may, for example, be preferably a fluoride of a $C_{2-6}$ linear or branched chain olefin or a $C_{4-6}$ cyclic olefin.

Specifically, it may, for example, be ethylene having from 1 to 3 fluorine atoms introduced, propene having from 1 to 5 fluorine atoms introduced, a butene having from 1 to 7 fluorine atoms introduced, a pentene having from 1 to 9 fluorine atoms introduced, a hexane having from 1 to 11 fluorine atoms introduced, cyclobutene having from 1 to 5 fluorine atoms introduced, cyclopenene having from 1 to 7 fluorine atoms introduced, or cyclohexene having from 1 to 9 fluorine atoms introduced.

Among such unsaturated fluorinated hydrocarbon compounds, preferred is a $C_{2-3}$ unsaturated fluorinated hydrocarbon compound, more preferred is a fluoride of $C_2$ ethylene. Such a $C_{2-3}$ unsaturated fluorinated hydrocarbon compound may, for example, be trifluoroethylene (HFO-1123), 2,3,3,3-tetrafluoropropene (HFO-1234yf), 1,2-difluoroethylene (HFO-1132), 2-fluoropropene (HFO-1261yf), 1,1,2-trifluoropropene (HFO-1243yc), (E)-1,2,3,3,3-pentafluoropropene (HFO-1225ye(E)), (Z)-1,2,3,3,3-pentafluoropropene (HFO-1225ye(Z)), (E)-1,3,3,3-tetrafluoropropene (HFO-1234ze(E)), (Z)-1,3,3,3-tetrafluoropropene (HFO-1234ze(Z)) or 3,3,3-trifluoropropene (HFO-1243zf).

In the present invention, the unsaturated fluorinated hydrocarbon compound may be used alone or in combination of two or more.

The working fluid of the present invention may contain an optional component described hereinafter as the case requires in addition to the unsaturated fluorinated hydrocarbon compound of the formula (I). The content of the unsaturated fluorinated hydrocarbon compound of the formula (I) is preferably at least 10 mass %, more preferably from 20 to 80 mass %, further preferably from 40 to 80 mass %, still more preferably from 40 to 60 mass % per 100 mass % of the working fluid.

(HFO-1123)

Now, a working fluid containing HFO-1123 as an essential component will be described as an example of the unsaturated fluorinated hydrocarbon compound of the formula (I). However, HFO-1123 may be replaced with the unsaturated fluorinated hydrocarbon compound of the formula (I) other than HFO-1123.

First, properties of HFO-1123 as a working fluid are shown in Table 1 particularly in terms of relative comparison with R410A (a pseudoazeotropic mixture of HFC-32 and HFC-125 in a mass ratio of 1:1). The cycle performance is represented by the coefficient of performance and the refrigerating capacity obtained by the after-mentioned method. The coefficient of performance and the refrigerating capacity of HFO-1123 are represented by relative values based on R410A (1.000) (hereinafter referred to as relative coefficient of performance and relative refrigerating capacity). The global warming potential (GWP) is a value (100 years) in Intergovernmental Panel on Climate Change (IPCC), Fourth assessment report (2007), or a value measured in accordance therewith. In this specification, GWP is such a value unless otherwise specified. In a case where the working fluid is a mixture, the temperature glide is an important factor in evaluation of the working fluid and is preferably smaller, as described hereinafter.

TABLE 1

|  | R410A | HFO-1123 |
|---|---|---|
| Relative coefficient of performance | 1.000 | 0.921 |
| Relative refrigerating capacity | 1.000 | 1.146 |
| Temperature glide [° C.] | 0.2 | 0 |
| GWP | 2088 | 0.3 |

[Optional Component]

The working fluid used in the present invention may optionally contain a compound commonly used for a working fluid, in addition to HFO-1123, within a range not to impair the effects of the present invention. Such an optional compound (optional component) may, for example, be a HFC, a HFO (a HFC having a carbon-carbon double bond) other than HFO-1123, or another component which is vaporized and liquefied together with HFO-1123. The optional component is preferably a HFC or a HFO (a HFC having a carbon-carbon double bond) other than HFO-1123.

The optional component is preferably a compound which can maintain GWP and the temperature glide within acceptable ranges while having an effect to further improve the relative coefficient of performance and the relative refrigerating capacity, when used for heat cycle in combination with HFO-1123. When the working fluid contains such a compound in combination with HFO-1123, more favorable cycle performance will be obtained while a low GWP is maintained, and influence over the temperature glide tends to be small.

(Temperature Glide)

In a case where the working fluid contains an optional component, it has a considerable temperature glide except for a case where HFO-1123 and the optional component form an azeotropic composition. The temperature glide of the working fluid varies depending upon the type of the optional component and the mixture ratio of HFO-1123 and the optional component.

In a case where a mixture is used as the working fluid, it is usually preferably an azeotropic mixture or a pseudoazeotropic mixture such as R410A. A non-azeotropic composition has a problem such that when it is put into a refrigerator or an air-conditioning apparatus from a pressure container, it undergoes a composition change. Further, if a refrigerant leaks out from a refrigerator or an air-conditioning apparatus, the refrigerant composition in the refrigerator or the air-conditioning apparatus is very likely to change, and a recovery to an initial refrigerant composition is hardly possible. Such problems can be avoided with an azeotropic or pseudoazeotropic mixture.

As an index to the applicability of a mixture as the working fluid, the "temperature glide" is commonly employed. The temperature glide is defined as properties such that the initiation temperature and the completion temperature of evaporation in an evaporator or of condensation in a condenser, for example, as the heat exchanger, differ from each other. The temperature glide of an azeotropic mixture is 0, and the temperature glide of a pseudoazeotropic mixture is extremely close to 0, for example, the temperature glide of R410A is 0.2.

If the temperature glide is large, for example, the inlet temperature of an evaporator tends to be low, and frosting is likely to occur. Further, in a heat cycle system, the heat exchange efficiency is to be improved by making the working fluid and the heat source fluid such as water or the air flowing in heat exchangers flow in counter-current flow. Since the temperature difference of the heat source fluid is small in a stable operation state, it is difficult to obtain a heat cycle system with a good energy efficiency with a non-azeotropic mixture fluid with a large temperature glide. Accordingly, when a mixture is used as a working fluid, a working fluid with an appropriate temperature glide is desired.

(HFC)

The HFC as the optional component is preferably selected from the above viewpoint. Here, a HFC is known to have a higher GWP as compared with HFO-1123. Accordingly, the HFC to be used in combination with HFO-1123 is preferably selected properly particularly with a view to maintaining GWP within an acceptable range, in addition to improving the cycle performance as the working fluid and maintaining the temperature glide within an appropriate range.

A HFC which has less influence over the ozone layer and which has less influence over global warming, is specifically preferably a $C_{1-5}$ HFC. The HFC may be linear, branched or cyclic.

The HFC may, for example, be a fluorinated $C_{1-5}$ alkane, and may be preferably trifluoromethane, difluoromethane (HFC-32), difluoroethane, trifluoroethane, tetrafluoroethane, pentafluoroethane (HFC-125), trifluoroiodomethane, pentafluoropropane, hexafluoropropane, heptafluoropropane, pentafluorobutane, heptafluorocyclopentane or the like.

Particularly, in view of less influence over the ozone layer and excellent refrigerating cycle performance, the HFC is preferably HFC-32, 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a) or 1,1,1,2,2-pentafluoroethane (HFC-125), more preferably HFC-32, HFC-152a, HFC-134a or HFC-125.

The HFC may be used alone or in combination of two or more.

The content of the HFC in the working fluid (100 mass %) can be optionally selected depending upon the properties required for the working fluid. For example, in the case of a working fluid comprising HFO-1123 and HFC-32, the coefficient of performance and the refrigerating capacity will improve with a HFC-32 content within a range of from 1 to 99 mass %. In the case of a working fluid comprising HFO-1123 and HFC-134a, the coefficient of performance will improve with a HFC-134a content within a range of from 1 to 99 mass %.

Further, with respect to GWP of the preferred HFC, GWP of HFC-32 is 675, GWP of HFC-134a is 1,430, and GWP of HFC-125 is 3,500. With a view to keeping GWP of the obtainable working fluid low, the HFC as the optional component is most preferably HFC-32.

Further, HFO-1123 and HFC-32 may form a pseudoazeotropic mixture close to an azeotropic mixture within a composition range of from 99:1 to 1:99 by the mass ratio, and the temperature glide of a mixture of them is close to 0 substantially regardless of the composition range. In this view also, as the HFC to be used in combination with HFO-1123, HFC-32 is advantageous.

In a case where HFC-32 is used together with HFO-1123 for the working fluid of the present invention, the content of HFC-32 is specifically preferably at least 20 mass %, more preferably from 20 to 80 mass %, further preferably from 40 to 60 mass % per 100 mass % of the working fluid.

(HFO Other than HFO-1123)

The HFO other than HFO-1123 is also preferably selected from the same viewpoint as the above HFC. Here, GWP of the HFO even other than HFO-1123 is an order of magnitude lower than the HFC. Accordingly, the HFO other than HFO-1123 used in combination with HFO-1123 is preferably selected properly particularly with a view to improving the cycle performance as the working fluid and maintaining the temperature glide within an appropriate range, rather than considering GWP.

The HFO other than HFO-1123 may, for example, be 2,3,3,3-tetrafluoropropene (HFO-1234yf), 1,2-difluoroethylene (HFO-1132), 2-fluoropropene (HFO-1261yf), 1,1,2-trifluoropropene (HFO-1243yc), (E)-1,2,3,3,3-pentafluoropropene (HFO-1225ye(E)), (Z)-1,2,3,3,3-pentafluoropropene (HFO-1225ye(Z)), (E)-1,3,3,3-tetrafluoropropene (HFO-1234ze(E)), (Z)-1,3,3,3-tetrafluoropropene (HFO-1234ze(Z)) or 3,3,3-trifluoropropene (HFO-1243zf).

Particularly, the HFO other than HFO-1123 is, in view of a high critical temperature and excellent durability and coefficient of performance, preferably HFO-1234yf (GSP: 4), HFO-1234ze(E) or HFO-1234ze(Z) (GWPs of both (E)-form and (Z)-form being 6), more preferably HFO-1234yf. The HFO other than HFO-1123 may be used alone or in combination of two or more.

The content of the HFO other than HFO-1123 in the working fluid (100 mass %) may be optionally selected depending upon the properties required for the working fluid. For example, in the case of a working fluid comprising HFO-1123 and HFO-1234yf or HFO-1234ze, the coefficient of performance will improve with a HFO-1234yf or HFO-1234ze content within a range of from 1 to 99 mass %.

A preferred composition range in a case where the working fluid used in the present invention contains HFO-1123 and HFO-1234yf will be described below as the composition range (S).

In the formulae indicating the composition range (S), abbreviated names of the respective compounds indicate the proportions (mass %) of the respective compounds based on the entire amount of HFO-1123, HFO-1234yf and other components (such as HFC-32).

<Composition Range (S)>
HFO-1123+HFO-1234yf≥70 mass %
95 mass %≥HFO-1123/(HFO-1123+HFO-1234yf)≥35 mass %

The working fluid in the composition range (S) has a very low GWP and has a small temperature glide. Further, it has refrigerating cycle performance sufficient as an alternative to conventional R410A also from the viewpoint of the coefficient of performance, the refrigerating capacity and the critical temperature.

In the working fluid in the composition range (S), based on the total amount of HFO-1123 and HFO-1234yf, the proportion of HFO-1123 is more preferably from 40 to 95 mass %, further preferably from 50 to 90 mass %, particularly preferably from 50 to 85 mass %, most preferably from 60 to 85 mass %.

Further, the total content of HFO-1123 and HFO-1234yf in 100 mass % of the working fluid is more preferably from 80 to 100 mass %, further preferably from 90 to 100 mass %, particularly preferably from 95 to 100 mass %.

Further, the working fluid used in the present invention may be a combination of HFO-1123, a HFC and a HFO other than HFO-1123. In such a case, the working fluid preferably comprises HFO-1123, HFC-32 and HFO-1234yf, and the proportions of the respective compounds based on the entire amount of the working fluid are preferably within the following ranges.

10 mass %≤HFO-1123≤80 mass %
10 mass %≤HFC-32≤75 mass %
5 mass %≤HFO-1234yf≤60 mass %

Further, in a case where the working fluid used in the present invention contains HFO-1123, HFO-1234yf and HFC-32, a preferred composition range (P) is shown below.

In the following formulae indicating the composition range (P), abbreviated names of the respective compounds indicate the proportions (mass %) of the respective compounds based on the entire amount of HFO-1123, HFO-1234yf and HFC-32. The same applies to the composition ranges (R), (L) and (M). Further, in the following composition range, the total content of HFO-1123, HFO-1234yf and HFC-32 specifically described is preferably higher than 90 mass % and at most 100 mass % based on the entire amount of the working fluid for heat cycle.

<Composition Range (P)>
70 mass %≤HFO-1123+HFO-1234yf
30 mass %≤HFO-1123≤80 mass %
0 mass %≤HFO-1234yf≤40 mass %
0 mass %<HFC-32≤30 mass %
HFO-1123/HFO-1234yf≤95/5 mass %

The working fluid in the above composition is a working fluid having respective characteristics of HFO-1123, HFO-1234yf and HFC-32 in a balanced manner, and having defects of the respective components suppressed. That is, the working fluid is a working fluid which has a very low GWP, has a small temperature glide and has a certain performance and efficiency when used for heat cycle, and thus with such a working fluid, favorable cycle performance will be obtained. Here, the total amount of HFO-1123 and HFO-1234yf based on the total amount of HFO-1123, HFO-1234yf and HFC-32 is preferably at least 70 mass %.

Further, as a more preferred composition of the working fluid used in the present invention, a composition containing HFO-1123 in a proportion of from 30 to 70 mass %, HFO-1234yf in a proportion of from 4 to 40 mass % and HFC-32 in a proportion of from 0 to 30 mass % based on the total amount of HFO-1123, HFO-1234yf and HFC-32, and having a content of HFO-1123 being at most 70 mol % based on the entire amount of the working fluid, may be mentioned. A working fluid in the above range is a working fluid of which self-decomposition reaction of HFO-1123 is suppressed, and which has high durability, in addition to the above effects increased. From the viewpoint of the relative coefficient of performance, the content of HFC-32 is preferably at least 5 mass %, more preferably at least 8 mass %.

Further, another preferred composition in a case where the working fluid used in the present invention contains HFO-1123, HFO-1234yf and HFC-32 will be shown, and when the content of HFO-1123 based on the entire amount of the working fluid is at most 70 mol %, a working fluid of which self-decomposition reaction of HFO-1123 is suppressed and which has high durability can be obtained.

A more preferred composition range (R) will be described below.

<Composition Range (R)>
10 mass %≤HFO-1123<70 mass %
0 mass %<HFO-1234yf≤50 mass %
30 mass %<HFC-32≤75 mass %

The working fluid in the above composition is a working fluid having respective characteristics of HFO-1123, HFO-1234yf and HFC-32 in a balanced manner, and having defects of the respective components suppressed. That is, it is a working fluid which has a low GWP, which has durability secured, and which has a small temperature glide and has high performance and efficiency when used for heat cycle, and thus with such a working fluid, favorable cycle performance will be obtained.

A preferred range of the working fluid of the present invention in the composition range (R) will be described below.

20 mass %≤HFO-1123<70 mass %
0 mass %<HFO-1234yf≤40 mass %
30 mass %<HFC-32≤75 mass %

The working fluid in the above composition is a working fluid having respective characteristics of HFO-1123, HFO-1234yf and HFC-32 in a balanced manner, and having defects of the respective components suppressed. That is, it is a working fluid which has a low GWP, which has durability secured, and which has a smaller temperature glide and has higher performance and efficiency when used for heat cycle, and thus with such a working fluid, favorable cycle performance will be obtained.

A more preferred composition range (L) of the working fluid of the present invention in the above composition range (R) will be described below. A composition range (M) is still more preferred.

<Composition Range (L)>
10 mass %≤HFO-1123<70 mass %
0 mass %<HFO-1234yf≤50 mass %
30 mass %<HFC-32≤44 mass %

<Composition Range (M)>
20 mass %≤HFO-1123<70 mass %
5 mass %<HFO-1234yf≤40 mass %
30 mass %<HFC-32≤44 mass %

The working fluid in the composition range (M) is a working fluid having respective characteristics of HFO- 1123, HFO-1234yf and HFC-32 in a balanced manner, and having defects of the respective components suppressed. That is, such a working fluid is a working fluid of which the upper limit of GWP is suppressed to be so low as at most 300, which has durability secured, and which has a small temperature glide of less than 5.8 and has a relative coefficient of performance and a relative refrigerating capacity close to 1, when used for heat cycle, and thus with such a working fluid, favorable cycle performance will be obtained.

Within such a range, the upper limit of the temperature glide is lowered, and the lower limit of the product of the relative coefficient of performance and the relative refrigerating capacity is increased. In view of a high relative coefficient of performance, more preferably 8 mass %≤HFO-1234yf. Further, in view of a high relative refrigerating capacity, more preferably HFO-1234yf≤35 mass %.

(Other Optional Component)

The working fluid to be used for the composition for a heat cycle system of the present invention may contain, other than the above optional component, carbon dioxide, a hydrocarbon, a chlorofluoroolefin (CFO), a hydrochlorofluoroolefin (HCFO), or the like. Such another optional component is preferably a component which has less influence over the ozone layer and which has less influence over global warming.

The hydrocarbon may, for example, be propane, propylene, cyclopropane, butane, isobutane, pentane or isopentane.

The hydrocarbon may be used alone or in combination of two or more.

In a case where the working fluid contains a hydrocarbon, its content is less than 10 mass %, preferably from 1 to 5 mass %, more preferably from 3 to 5 mass % per 100 mass % of the working fluid. When the content of the hydrocarbon is at least the lower limit, the solubility of a mineral refrigerant oil in the working fluid will be more favorable.

The CFO may, for example, be chlorofluoropropene or chlorofluoroethylene. With a view to suppressing flammability of the working fluid without significantly decreasing the cycle performance of the working fluid, the CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112).

The CFO may be used alone or in combination of two or more.

In a case where the working fluid contains the CFO, its content is less than 10 mass %, preferably from 1 to 8 mass %, more preferably from 2 to 5 mass % per 100 mass % of the working fluid. When the content of the CFO is at least the lower limit, the flammability of the working fluid tends to be suppressed. When the content of the CFO is at most the upper limit, favorable cycle performance is likely to be obtained.

The HCFO may, for example, be hydrochlorofluoropropene or hydrochlorofluoroethylene. With a view to suppressing flammability of the working fluid without significantly decreasing the cycle performance of the working fluid, the HCFO is preferably 1-chloro-2,3,3,3-tetrafluoropropene (HCFO-1224yd) or 1-chloro-1,2-difluoroethylene (HCFO-1122).

The HCFO may be used alone or in combination of two or more.

In a case where the working fluid contains the HCFO, the content of the HCFO per 100 mass % of the working fluid is less than 1 mass %, preferably from 1 to 8 mass %, more preferably from 2 to 5 mass %. When the content of the HCFO is at least the lower limit, the flammability of the working fluid tends to be suppressed. When the content of the HCFO is at most the upper limit, favorable cycle performance is likely to be obtained.

In a case where the working fluid to be used for the composition for a heat cycle system of the present invention contains the above other optional component, the total content of such optional components in the working fluid is less than 10 mass %, preferably at most 8 mass %, more preferably at most 5 mass % per 100 mass % of the working fluid.

<Refrigerant Oil>

The composition for a heat cycle system of the present invention comprises, in addition to the above working fluid, a refrigerant oil which can improve lubricating properties of the working fluid.

The refrigerant oil in the present invention has a breakdown voltage of at least 25 kV. By using a refrigerant oil having a breakdown voltage of at least 25 kV, insulation is maintained even in a heat cycle system in which an electromagnet for driving and the refrigerant oil are brought into direct contact with each other, and the heat cycle system will be stably operated. The breakdown voltage is more preferably at least 30 kV, further preferably at least 40 kV. The breakdown voltage of a refrigerant oil in this specification is a value in a catalogue, or it is evaluated whether it is 25 kV or 50 kV or above or below by simplified confirmation in accordance with JIS C2101.

Further, the refrigerant oil has a hydroxy value of at most 0.1 mgKOH/g. By the refrigerant oil having a sufficiently low hydroxy value of at most 0.1 mgKOH/g, it is possible to prevent formation of hydroxy radicals which may cause deterioration by polymerization or decomposition of the refrigerant oil or the working fluid for heat cycle. Hydroxy radicals are estimated, in a system using a working fluid having a carbon-carbon double bond, to attack and decompose the double bond, thus generating an acid. If an acid is generated, corrosion or deterioration of members or the like constituting the heat cycle system may occur. Accordingly, in the present invention in which the hydroxy value is low as mentioned above, generation of an acid can be significantly suppressed, and the heat cycle system can be stably operated. The hydroxy value is more preferably at most 0.05 mgKOH/g. The hydroxy value in this specification is measured in accordance with JIS K2501.

Further, the refrigerant oil has a minimum temperature on the high temperature side of at least 35° C. and a maximum temperature on the low temperature side of at most −60° C., of the phase separation temperature from the working fluid for heat cycle of the above formula (I) used in combination. That is, such means that the working fluid for heat cycle and the refrigerant oil are present as being compatible with each other under conditions of operation of the heat cycle system, and in such a case, the heat cycle system can be stably operated since the composition for a heat cycle system in a liquid state does not undergo phase separation and is uniform. The minimum temperature on the high temperature side of the phase separation temperature is at least 35° C., preferably at least 40° C. The maximum temperature on the low temperature side is at most −60° C., preferably at most −70° C. Here, a mixture of the working fluid for heat cycle and the refrigerant oil used to measure the phase separation temperature is usually a mixture containing from 10 to 50 mass % of the refrigerant oil, and is preferably a mixture having a content of the refrigerant oil of from 10 to 20 mass %. The phase separation temperature in this specification is a value measured in accordance with JIS K2211.

Further, the kinematic viscosity of the refrigerant oil at 40° C. is preferably from 5 to 200 mm$^2$/s, more preferably from 5 to 100 mm$^2$/s in that the lubricity and the closeability of a compressor are not lowered, the lubricating machine oil is satisfactorily compatible with the working fluid under low temperature conditions, it is possible to prevent lubricity failure of a refrigerator or a compressor, and heat exchange in an evaporator can be sufficiently conducted. Further, the kinematic viscosity at 100° C. is preferably from 1 to 100 mm$^2$/s, more preferably from 2 to 30 mm$^2$/s, with a view to maintaining the electric power consumption and the abrasion resistance within proper ranges. The kinematic viscosity in this specification is a value measured in accordance with JIS K2283.

Further, the refrigerant oil has an aniline point of preferably at least −100° C. and at most 0° C. "The aniline point" is a value indicating the solubility of a hydrocarbon-based solvent for example, and is a value measured in accordance with JIS K2256 in such a manner that equal volumes of a sample (the refrigerant oil) and aniline are mixed and cooled, and the temperature at which they are no more miscible with each other and turbidity starts being observed is recorded as the aniline point. Such a value is a value of the refrigerant oil by itself in which no working fluid for heat cycle is dissolved.

In a heat cycle system to which the composition for a heat cycle system comprising the working fluid for heat cycle represented by the formula (I) of the present invention, since the working fluid has a carbon-carbon double bond, as described hereinafter, usually, an acid resistant resin material or the like as described in [heat cycle system] is employed in some part instead of a member made of a metal such as copper commonly used as a member constituting a heat cycle system. However, even with such a resin material, depending upon the type of refrigerant oil used, the resin material may have drawbacks in some cases due to e.g. shrinkage or swelling resulting from the refrigerant oil. Accordingly, by using the refrigerant oil having an aniline point within the above predetermined range (at least −100° C. and at most 0° C.), deformation by swelling/shrinkage of the resin material can be prevented, and it is possible to prevent a slide member in a compression mechanism, an insulating material of an electric motor, a sealing member in the interior of a heat cycle system, and the like from malfunctioning or breaking down due to deterioration or damages.

The refrigerant oil used in the present invention may, for example, be specifically an oxygen-containing synthetic oil (an ester refrigerant oil, an ether refrigerant oil or a polyglycol refrigerant oil).

Among them, from the viewpoint of the compatibility with the fluorinated hydrocarbon compound as an essential working fluid component in the present invention, an ester refrigerant oil or an ether refrigerant oil is suitable. Further, the ester refrigerant oil is preferably a polyol ester refrigerant oil, and the ether refrigerant oil is preferably a polyvinyl ether refrigerant oil.

Particularly in the case of an ester refrigerant oil or an ether refrigerant oil, as atoms constituting the refrigerant oil, carbon atoms and oxygen atoms are representatively mentioned. If the proportion (carbon/oxygen molar ratio) of carbon atoms to oxygen atoms is too low, moisture absorbance tends to be high, and if the proportion is too high, the compatibility with the working fluid will be decreased. From such a viewpoint, the proportion of carbon atoms to oxygen atoms in the refrigerant oil is suitably from 2 to 7.5 by the molar ratio.

<Ester Refrigerant Oil>

As the ester refrigerant oil, in view of chemical stability, a dibasic acid ester refrigerant oil of a dibasic acid and a monohydric alcohol, a polyol ester refrigerant oil of a polyol and a fatty acid, a complex ester refrigerant oil of a polyol, a polybasic acid and a monohydric alcohol (or a fatty acid), a polyol carbonate ester refrigerant oil or the like may be mentioned as the base oil component.

(Dibasic Acid Ester Refrigerant Oil)

The dibasic acid ester refrigerant oil is preferably an ester of a dibasic acid such as oxalic acid, malonic acid, succinic acid, glutaric acid, adipic acid, pimelic acid, suberic acid, azelaic acid, sebacic acid, phthalic acid, isophthalic acid or terephthalic acid, particularly a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol, ethanol, propanol, butanol, pentanol, hexanol, heptanol, octanol, nonanol, decanol, undecanol, dodecanol, tridecanol, tetradecanol or pentadecanol). Such a dibasic acid ester refrigerant oil may, for example, be specifically ditridecyl glutarate, di(2-ethylhexyl) adipate, diisodecyl adipate, ditridecyl adipate or di(3-ethylhexyl) sebacate.

(Polyol Ester Refrigerant Oil)

The polyol ester refrigerant oil is an ester synthesized from a polyhydric alcohol and a fatty acid (a carboxylic acid).

The polyhydric alcohol constituting the polyol ester refrigerant oil may be a diol (such as ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol or 1,12-dodecanediol), a polyol having from 3 to 20 hydroxy groups (such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (a dimer or trimer of glycerin), 1,3,5-pentanetriol, sorbitol, sorbitan, a sorbitol/glycerin condensate, a polyhydric alcohol such as adonitol, arabitol, xylitol or mannitol, a saccharide such as xylose, arabinose, ribose, rhamnose, glucose, fructose, galactose, mannose, sorbose, cellobiose, maltose, isomaltose, trehalose, sucrose, raffinose, gentianose or melezitose, or a partially etherified product thereof), and the polyhydric alcohol constituting the ester may be used alone or in combination of two or more.

The number of carbon atoms in the fatty acid constituting the polyol ester refrigerant oil is not particularly limited, but usually a $C_{1-24}$ fatty acid is employed. A linear fatty acid or a branched fatty acid is preferred. The linear fatty acid may, for example, be acetic acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, oleic acid, linoleic acid or linoleic acid, and the hydrocarbon group bonded to the carboxy group may be a totally saturated hydrocarbon or may have an unsaturated hydrocarbon. Further, the branched fatty acid may, for example, be 2-methylpropanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 2,2,3-trimethylbutanoic acid, 2,3,3-trimethylbutanoic acid, 2-ethyl-2-methylbutanoic acid, 2-ethyl-3-methylbutanoic acid, 2-methylheptanoic acid, 3-methylheptanoic acid, 4-methylheptanoic acid, 5-methylheptanoic acid, 6-methylheptanoic acid, 2-ethylhexanoic acid, 3-ethylhexanoic acid, 4-ethylhexanoic acid, 2,2-dimethylhexanoic acid, 2,3-dimethylhexanoic acid, 2,4-dimethylhexanoic acid, 2,5-dimethylhexanoic acid, 3,3-dimethylhexanoic acid, 3,4-dimethylhexanoic acid, 3,5-dimethylhexanoic acid, 4,4-dimethylhexanoic acid, 4,5-dimethylhexanoic acid, 5,5-dimethylhexanoic acid, 2-propylpentanoic acid, 2-methyloctanoic acid, 3-methyloctanoic acid, 4-methyloctanoic acid, 5-methyloctanoic acid, 6-methyloctanoic acid, 7-methyloctanoic acid, 2,2-dimethylheptanoic acid, 2,3-dimethylheptanoic acid, 2,4-dimethylheptanoic acid, 2,5-dimethylheptanoic acid, 2,6-dimethylheptanoic acid, 3,3-dimethylheptanoic acid, 3,4-dimethylheptanoic acid, 3,5-dimethylheptanoic acid, 3,6-dimethylheptanoic acid, 4,4-dimethylheptanoic acid, 4,5-dimethylheptanoic acid, 4,6-dimethylheptanoic acid, 5,5-dimethylheptanoic acid, 5,6-dimethylheptanoic acid, 6,6-dimethylheptanoic acid, 2-methyl-2-ethylhexanoic acid, 2-methyl-3-ethylhexanoic acid, 2-methyl-4-ethylhexanoic acid, 3-methyl-2-ethylhexanoic acid, 3-methyl-3-ethylhexanoic acid, 3-methyl-4-ethylhexanoic acid, 4-methyl-2-ethylhexanoic acid, 4-methyl-3-ethylhexanoic acid, 4-methyl-4-ethylhexanoic acid, 5-methyl-2-ethylhexanoic acid, 5-methyl-3-ethylhexanoic acid, 5-methyl-4-ethylhexanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid or 2,2-diisopropylpropanoic acid. The ester may be an ester of one or more of such fatty acids.

The polyol constituting the ester may be used alone or as a mixture of two or more. Further, the fatty acid constituting the ester may be a single component or may be two or more types. Further, the fatty acid may be used alone or as a mixture of two or more. Further, the polyol ester refrigerant oil may have a free hydroxy group.

Among them, a particularly preferred polyol ester refrigerant oil is characterized by containing an ester obtained by using the following compounds (a) to (c):

(a) a compound having at least two hydroxy groups or its derivative, hydroxy groups, (b) a compound having at least two carboxy groups or its derivative, and (c) a compound having one carboxy group or its derivative and/or a compound having one hydroxy group or its derivative, and being used together with the working fluid of the above formula (I), and can satisfy the lubricity, the sealing property, the compatibility with the working fluid, thermal/chemical stability, electrical insulating properties, etc. sufficiently in a balanced manner, and can sufficiently prevent lubricity failure of a compressor and a decrease in the refrigerating efficiency.

The compound (a) constituting the ester is a compound having at least two hydroxy groups or its derivative. The number of hydroxy groups is preferably from 2 to 6 in that an appropriate viscosity is secured and in view of the compatibility with the working fluid of the above formula (I). Further, if only a compound having one hydroxy group or its derivative is used as the alcohol component, the obtainable ester hardly has a sufficient viscosity, lubricity failure or a decrease of the refrigerating efficiency tends to occur, and thermal/chemical stability or low temperature flowability tends to be insufficient.

The compound (a) may, for example, be specifically a polyhydric alcohol, a polyhydric phenol, a polyhydric aminoalcohol or a condensate thereof, or a compound having hydroxy groups of such a compound esterified by a carboxylic acid such as acetic acid, and among them, a polyhydric alcohol, its condensate or its derivative is preferred, whereby the compatibility with the working fluid, electrical insulating properties and thermal stability tend to be more improved.

The number of carbon atoms in such a polyhydric alcohol is not particularly limited, and a $C_{2-12}$ polyhydric alcohol is preferably used. As such a polyhydric alcohol, a dihydric alcohol (diol) may, for example, be specifically ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol or 1,12-dodecanediol. Further, a trihydric or higher alcohol may, for example, be specifically a polyhydric alcohol such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (a dimer or trimer of glycerin), 1,3,5-pentanetriol, sorbitol, sorbitan, a sorbitol/glycerin condensate, adonitol, arabitol, xylitol or mannitol, a saccharide such as xylose, arabinose, ribose, rhamnose, glucose, fructose, galactose, mannose, sorbose or cellobiose, or a partially etherified product thereof. Among them, preferred is a hindered alcohol such as neopentyl glycol, trimethylolethane, trimethylolpropane, trimethylolbutane, di-(trimethylolpropane), tri-(trimethylolpropane), pentaerythritol or di-(pentaerythritol).

Further, for the ester, as described above, as the compound (a), a compound having hydroxy groups esterified by a carboxylic acid may be used. Such a derivative is preferably a compound having hydroxy groups esterified by a lower carboxylic acid, and specifically, an acetate or propionate of the compound exemplified as the above polyhydric alcohol is preferably used.

The compound (b) constituting the above ester is a compound having at least two carboxy groups or its derivative. The number of carboxy groups is preferably from 2 to 6. If only a compound having one carboxy group or its derivative is used as the acid component, the obtainable ester hardly has a sufficient viscosity, lubricity failure or a decrease of the refrigerating efficiency tends to occur, and thermal/chemical stability or low temperature flowability tends to be insufficient.

The compound (b) may, for example, be a bivalent to hexavalent carboxylic acid, or a carboxylic acid derivative such as its acid anhydride, ester or acid halide.

The number of carbon atoms in such a bivalent to hexavalent carboxylic acid is not particularly limited, and a $C_{2-10}$ bivalent carboxylic acid is preferably used. Such a bivalent to hexavalent carboxylic acid may, for example, be specifically a saturated aliphatic dicarboxylic acid such as oxalic acid, malonic acid, succinic acid, glutaric acid, adipic acid, pimelic acid, suberic acid, azelaic acid, sebacic acid, methylmalonic acid, ethylmalonic acid, dimethylmalonic acid, methylsuccinic acid, 2,2-dimethylsuccinic acid, 2,3-dimethylsuccinic acid, 2-ethyl-2-methylsuccinic acid, 2-methylglutaric acid, 3-methylglutaric acid or 3-methyladipic acid; an unsaturated aliphatic dicarboxylic acid such as maleic acid, fumaric acid, itaconic acid, citraconic acid or mesaconic acid; an alicyclic dicarboxylic acid such as 1,2-cyclohexanedicarboxylic acid or 4-cyclohexene-1,2-dicarboxylic acid; or an aromatic polyvalent carboxylic acid such as phthalic acid, terephthalic acid, isophthalic acid, trimellitic acid or pyromellitic acid, and among them, a bivalent carboxylic acid is preferred, and a saturated aliphatic dicarboxylic acid is more preferred in view of oxidation stability.

Further, for the ester, as described above, as the compound (b), a derivative of a compound having two carboxy groups may be used. Such a derivative may, for example, be an ester, an acid anhydride or an acid halide, and among them, an ester of the above bivalent carboxylic acid and a lower alcohol (more preferably methanol or ethanol) is preferably used.

The compound (c) constituting the above ester is a compound having one carboxy group or its derivative and/or a compound having one hydroxy group or its derivative. As such a compound (c), either one of a compound having one carboxy group or its derivative and a compound having one hydroxy group or its derivative may be used alone, or a mixture of both may be used. If only a compound having at least two carboxy groups or its derivative is used as the acid component and only a compound having at least two hydroxy groups or its derivative is used as the alcohol component, the obtainable ester tends to have insufficient thermal/chemical stability.

The compound having one carboxy group or its derivative may, for example, be specifically a monovalent fatty acid, or its acid anhydride, ester or acid halide. The number of carbon atoms in such a monovalent fatty acid is not particularly limited, and a $C_{1-24}$ fatty acid is commonly used, however, the number of carbon atoms in the monovalent fatty acid is preferably at least 3, more preferably at least 4, further preferably at least 5, particularly preferably at least 8. If the number of carbon atoms in the monovalent fatty acid is less than 3, the lubricity which the obtainable ester intrinsically has tends to be insufficient, and in addition, the compatibility of the obtainable ester with the working fluid of the above formula (I) will be excessively high, whereby the ester will be diluted with the working fluid and the viscosity tends to be low, thus leading to a decrease in the refrigerating efficiency and lubricity failure due to a decrease in the sealing property.

Further, the number of carbon atoms in the monovalent fatty acid is preferably at most 22, more preferably at most 20, further preferably at most 18. If the number of carbon atoms in the monovalent fatty acid exceeds 22, the compatibility of the obtainable ester with the working fluid tends to be insufficient, thus leading to lubricity failure of a compressor and a decrease in the refrigerating efficiency due to a decrease in the oil return property.

The monovalent fatty acid as the compound (c) may be either linear or branched, however, a linear monovalent fatty acid is preferred in view of lubricity, and a branched monovalent fatty acid is preferred in view of thermal/hydrolysis stability. Further, the monovalent fatty acid may be either a saturated fatty acid or an unsaturated fatty acid.

The monovalent fatty acid as the compound (c) may, for example, be specifically a linear or branched fatty acid such as pentaoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid or oleic acid, or a fatty acid having a quaternary a carbon atom (a neo acid), and among them, valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), lauric acid (n-dodecanoic acid), myristic acid (n-tetradecanoic acid), palmitic acid (n-hexadecanoic acid), stearic acid (n-octadecanoic acid), oleic acid (cis-9-octadecenoic acid), isopentanoic acid (3-methylbutanoic acid), 2-methylhexanoic acid, 2-ethylpentanoic acid, 2-ethylhexanoic acid or 3,5,5-trim ethylhexanoic acid is preferably used.

Further, the compound having one hydroxy group or its derivative may, for example, be specifically a monohydric alcohol, a monohydric phenol, a monohydric aminoalcohol, or a compound having the hydroxy groups of such a compound esterified by a carboxylic acid such as acetic acid. The number of carbon atoms in such a compound is not particularly limited, and with a view to further improving both the lubricity and the compatibility with the working fluid of the obtainable ester, preferred is a $C_{1-24}$ compound, and among them, preferred is a $C_{3-18}$ linear monohydric alcohol, $C_{3-18}$ branched monohydric alcohol or a $C_{5-10}$ monohydric cycloalcohol.

The monohydric alcohol having carbon atoms within the above preferred range may, for example, be specifically a linear or branched propanol (including n-propanol, 1-methylethanol and the like), linear or branched butanol (including n-butanol, 1-methylpropanol, 2-methylpropanol and the like), linear or branched pentanol (including n-pentanol, 1-methylbutanol, 2-methylbutanol, 3-methylbutanol and the like), linear or branched hexanol (including n-hexanol, 1-methylpentanol, 2-methylpentanol, 3-methylpentanol and the like), linear or branched heptanol (including n-heptanol, 1-methylhexanol, 2-methylhexanol, 3-methylhexanol, 4-methylhexanol, 5-methylhexanol, 2,4-dimethylpentanol and the like), linear or branched octanol (including n-octanol, 2-ethylhexanol, 1-methylheptanol, 2-methylheptanol and the like), linear or branched nonanol (including n-nonanol, 1-methyloctanol, 3,5,5-trimethylhexanol, 1-(2'-methylpropyl)-3-methylbutanol and the like), linear or branched decanol (including n-decanol, isodecanol and the like), linear or branched undecanol (including n-undecanol, isoundecanol and the like), linear or branched dodecanol (including n-dodecanol, isododecanol, and the like), linear or branched tridecanol (including n-tridecanol, isotridecanol and the like), linear or branched tetradecanol (including n-tetradecanol, isotetradecanol and the like), linear or branched pentadecanol (including n-pentadecanol, isopentadecanol and the like), linear or branched hexadecanol (including n-hexadecanol, isohexadecanol and the like), linear or branched heptadecanol (including n-heptadecanol, isoheptadecanol and the like), linear or branched octadecanol (including n-octadecanol, isooctadecanol and the like), cyclohexanol, methylcyclohexanol or dimethylcyclohexanol.

Further, as the compound (c), a derivative having the hydroxy group esterified by a carboxylic acid may be used. Such a derivative is preferably an acetate, propionate or the like of the compound exemplified as the monohydric alcohol.

As the ester, particularly preferred is an ester obtained by using the following compounds (a'), (b') and (c'):

(a') at least one member selected from the group consisting of ethylene glycol, propylene glycol, butylene glycol, glycerin, neopentyl glycol, diethylene glycol, dipropylene glycol, dibutylene glycol and dibutylene glycol, (b') at least one member selected from the group consisting of oxalic acid, malonic acid, succinic acid, glutaric acid, adipic acid, pymellic acid, suberic acid, azelaic acid and sebacic acid; and (c') at least one member selected from the group consisting of valeric acid, caproic acid, enanthic acid, caprylic acid, pelargonic acid, capric acid, lauric acid, myristic acid, palmitic acid, stearic acid, oleic acid, isopentanoic acid, 2-methylhexanoic acid, 2-ethylpentanoic acid, 2-ethylhexanoic acid, 3,5,5-trimethylhexanoic acid, n-butanol, n-pentanol, n-hexanol, n-heptanol, n-octanol, n-nonanol, n-decanol, n-undecanol, n-dodecanol, n-tridecanol, n-tetradecanol, n-pentadecanol, n-hexadecanol, n-heptadecanol, n-octadecanol, isobutanol, isopentanol, isohexanol, isoheptanol, 2-ethylhexanol, 3,5,5-trimethylhexanol, isodecanol, isododecanol, isotetradecanol and isohexadecanol. When an ester obtained by using the above compounds (a') to (c') is incorporated in the refrigerant oil, the lubricity, the sealing property, the compatibility with the working fluid, the thermal/chemical stability, the electrical insulating properties, etc. tend to be satisfied in a balanced manner.

The composition ratio of the above compounds (a) to (c) is not particularly limited, however, the proportions of the compounds (a) to (c) are preferably within the following ranges, respectively, based on the total amount of the compounds (a) to (c), whereby the lubricity, the sealing property, the compatibility with the working fluid, the thermal/chemical stability, the electrical insulating properties, etc. tend to be satisfied in a better balanced manner.

Compound (a): from 3 to 55 mol %, preferably from 5 to 50 mol %, more preferably from 10 to 45 mol %.

Compound (b): from 3 to 55 mol %, preferably from 5 to 50 mol %, more preferably from 10 to 45 mol %.

Compound (c): from 3 to 90 mol %, preferably from 5 to 80 mol %, more preferably from 10 to 70 mol %.

The above-described ester is prepared by esterifying the above compounds (a) to (c) in accordance with a conventional method, preferably in an atmosphere of an inert gas such as nitrogen, in the presence of an esterifying catalyst or without a catalyst, with heating.

Further, in a case where an acetate, propionate or the like of an alcohol is used as the compound (a) or (c) or in a case where a lower alcohol ester or the like of a carboxylic acid is used as the compound (b) or (c), the ester may be obtained by a transesterification reaction.

The esterifying catalyst used in the above esterification reaction, may, for example, be specifically a Lewis acid such as an aluminum derivative, a tin derivative or a titanium derivative; an alkali metal salt such as a sodium alkoxide or a potassium alkoxide; or a sulfonic acid such as p-toluenesulfonic acid, methanesulfonic acid or sulfuric acid, and among them, a Lewis acid such as an aluminum derivative, a tin derivative or a titanium derivative is preferred, whereby the obtainable ester has higher thermal/hydrolysis stability, and a tin derivative is particularly preferred in view of the reaction efficiency. The amount of the esterifying catalyst is, for example, at a level of from 0.1 to 1 mass % based on the total amount of the compounds (a) to (c) as the raw materials.

The reaction temperature in the above esterification reaction may, for example, be from 150 to 230° C., and usually the reaction completes in from 3 to 30 hours.

Further, after completion of the esterification reaction, the raw materials in excess may be distilled off under reduced pressure or under normal pressure, and then a conventional purification method such as liquid-liquid extraction, vacuum distillation or adsorption purification treatment such as activated carbon treatment may be carried out to purify the ester.

Here, the esterification reaction using the specific compounds (a) to (c) has been described, however, even in other cases, the obtainable reaction product may be a mixture. Further, in a case where the ester is a mixture of at least two compounds, in view of the balance between the compatibility with the working fluid and various performances, and the production easiness, the content of an ester having the compound (a) and the compound (b) directly bonded is preferably from 10 to 100 mass %, more preferably from 20 to 100 mass %, further preferably from 25 to 100 mass % based on the entire amount of the mixture.

(Complex Ester Refrigerant Oil)

The complex ester refrigerant oil is an ester of a fatty acid and a dibasic acid, and a monohydric alcohol and a polyol. The fatty acid, the dibasic acid, the monohydric alcohol and the polyol may be the same as described above.

The fatty acid may be a fatty acid exemplified for the above polyol ester.

The dibasic acid may, for example, be oxalic acid, malonic acid, succinic acid, glutaric acid, adipic acid, pimelic acid, suberic acid, azelaic acid, sebacic acid, phthalic acid, isophthalic acid or terephthalic acid.

The polyol may be a polyol exemplified as the polyhydric alcohol for the above polyol ester. The complex ester is an ester of such a fatty acid, a dibasic acid and a polyol, and each compound may consist of a single component or several components.

(Polyol Carbonate Refrigerant Oil)

The polyol carbonate refrigerant oil is an ester of carbonic acid and a polyol.

The polyol may, for example, be a polyglycol (such as polyalkylene glycol, its ether compound or a modified compound thereof) obtained by homopolymerizing or copolymerizing a diol (as described above), a polyol (as described above), or one having a polyglycol added to a polyol.

The polyalkylene glycol may, for example, be one obtained by polymerizing a $C_{2-4}$ alkylene oxide (such as ethylene oxide or propylene oxide) using water or an alkali hydroxide as an initiator. Further, it may be one having a hydroxy group of a polyalkylene glycol etherified. One molecule of the polyalkylene glycol may contain single oxyalkylene units or two or more types of oxyalkylene units. It is preferred that at least oxypropylene units are contained in one molecule. Further, the polyol carbonate refrigerant oil may be a ring-opening polymer of a cyclic alkylene carbonate.

<Ether Refrigerant Oil>

The ether refrigerant oil may, for example, be a polyvinyl ether refrigerant oil or a polyalkylene glycol refrigerant oil.

(Polyvinyl Ether Refrigerant Oil)

The polyvinyl ether refrigerant oil may be one obtained by polymerizing a vinyl ether monomer, one obtained by copolymerizing a vinyl ether monomer and a hydrocarbon monomer having an olefinic double bond, or a copolymer of a polyvinyl ether and an alkylene glycol or a polyalkylene glycol or a monoether thereof.

Such a polyvinyl ether refrigerant oil is preferably a polyvinyl ether compound having a structure represented by the following formula (1) and having a molecular weight of from 300 to 3,000:

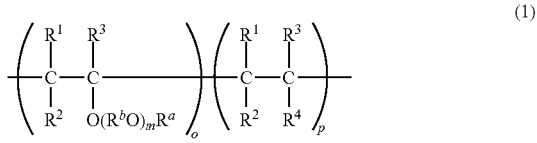

(1)

wherein each of $R^1$, $R^2$ and $R^3$ which are the same or different from each other, is a hydrogen atom or a $C_{1-8}$ hydrocarbon group, $R^b$ is a $C_{2-4}$ bivalent hydrocarbon group, $R^a$ is a hydrogen atom, a $C_{1-20}$ aliphatic or alicyclic hydrocarbon group, an aromatic group which may have a $C_{1-20}$ substituent, a $C_{2-20}$ acyl group or a $C_{2-50}$ oxygen-containing hydrocarbon group, $R^4$ is a $C_{1-10}$ hydrocarbon group, and in a case where there are a plurality of each of $R^a$, $R^b$ and $R^4$, they may be the same or different, an average of m is from 1 to 50, o is a number of from 1 to 50, and p is a number of from 2 to 25, and in a case where there are a plurality of o and p, the units may be either block or random, respectively.

The $C_{1-8}$ hydrocarbon group as each of $R^1$ to $R^3$ may, for example, be an alkyl group such as a methyl group, an ethyl group, a n-propyl group, an isopropyl group, a n-butyl group, an isobutyl group, a sec-butyl group, a tert-butyl group, various forms of a pentyl group, various forms of a hexyl group, various forms of a heptyl group or various forms of an octyl group, a cycloalkyl group such as a cyclopentyl group, a cyclohexyl group, various forms of a methylcyclohexyl group, various forms of an ethylcyclohexyl group or various forms of a dimethylcyclohexyl group, an aryl group such as a phenyl group, various forms of a methylphenyl group, various forms of an ethylphenyl group or various forms of a dimethylphenyl group, or an arylalkyl group such as a benzyl group, various forms of a phenylethyl group or various forms of a methylbenzyl group. Each of $R^1$, $R^2$ and $R^3$ is particularly preferably a hydrogen atom.

The $C_{2-4}$ bivalent hydrocarbon group represented by $R^b$ is specifically a bivalent alkylene such as a methylene group, an ethylene group, a propylene group, a trim ethylene group or various forms of a butylene group.

m in the formula (1) represents the number of repetition of $R^b$ O, and its average is within a range of from 1 to 50, preferably from 2 to 20, more preferably from 2 to 10, particularly preferably from 2 to 5. In a case where there are a plurality of $R^b$ O, the plurality of $R^b$ O may be the same or different.

Further, o is a number of from 1 to 50, preferably from 1 to 10, more preferably from 1 to 2, particularly preferably 1, and p is a number of from 2 to 25, preferably from 5 to 15, and in a case where there are a plurality of each of o and p, the units may be block or random, respectively.

The $C_{1-20}$ aliphatic or alicyclic hydrocarbon group as $R^a$ may be preferably a $C_{1-10}$ alkyl group or a $C_{5-10}$ cycloalkyl group, specifically, a methyl group, an ethyl group, a n-propyl group, an isopropyl group, a n-butyl group, an isobutyl group, a sec-butyl group, a tert-butyl group, various forms of a pentyl group, various forms of a hexyl group, various forms of a heptyl group, various forms of an octyl group, various forms of a nonyl group, various forms of a decyl group, a cyclopentyl group, a cyclohexyl group, various forms of a methylcyclohexyl group, various forms of an ethylcyclohexyl group, various forms of a propylcyclohexyl group or various forms of a dim ethylcyclohexyl group.

The aromatic group which may have a $C_{1-20}$ substituent as $R^a$ may, for example, be specifically an aryl group such as a phenyl group, various forms of a tolyl group, various forms of an ethylphenyl group, various forms of a xylyl group, various forms of a trimethylphenyl group, various forms of a butylphenyl group or various forms of a naphthyl group, or an arylalkyl group such as a benzyl group, various forms of a phenylethyl group, various forms of a methylbenzyl group, various forms of a phenylpropyl group or various forms of a phenylbutyl group.

Further, the $C_{2-20}$ acyl group as $R^a$ may, for example, be an acetyl group, a propionyl group, a butyryl group, an isobutyryl group, a valeryl group, an isovaleryl group, a pivaloyl group, a benzoyl group or a toluoyl group.

The $C_{2-50}$ oxygen-containing hydrocarbon group as $R^a$ may, for example, be specifically preferably a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group or a (1-methyl-2-methoxy)propyl group.

In the formula (1), the $C_{1-10}$ hydrocarbon group represented by $R^4$ may, for example, be an alkyl group such as a methyl group, an ethyl group, a n-propyl group, an isopropyl group, a n-butyl group, an isobutyl group, various forms of a pentyl group, various forms of a hexyl group, various forms of a heptyl group, various forms of an octyl group, various forms of a nonyl group or various forms of decyl, a cycloalkyl group such as a cyclopentyl group, a cyclohexyl group, various forms of a methylcyclohexyl group, various forms of an ethylcyclohexyl group, various forms of a propylcyclohexyl group or various forms of a dimethylcyclohexyl group, an aryl group such as a phenyl group, various forms of a methylphenyl group, various forms of an ethylphenyl group, various forms of a dimethylphenyl group, various forms of a propylphenyl group, various forms of a trimethylphenyl group, various forms of a butylphenyl group or various forms of a naphthyl group, or an arylalkyl group such as a benzyl group, various forms of a phenylethyl group, various forms of a methylbenzyl group, various forms of a phenylpropyl group or various forms of a phenylbutyl group.

$R^1$ to $R^3$, $R^a$, $R^b$, m and $R^1$ to $R^4$ may be respectively the same or differed from each other with respect to the respective structural units.

The polyvinyl ether compound may be obtained, for example, by copolymerizing a vinyl ether compound represented by the following formula (2) and a vinyl ether compound represented by the following formula (3):

(2)

(3)

In the above formulae, $R^a$, $R^b$, m and $R^1$ to $R^4$ are as defined above.

The vinyl ether compound represented by the formula (2) may, for example, be an alkylene glycol monovinyl ether, a polyoxyalkylene glycol monovinyl ether, an alkylene glycol alkyl vinyl ether or a polyoxyalkylene glycol alkyl vinyl ether. Specifically, it may, for example, be ethylene glycol monovinyl ether, ethylene glycol methyl vinyl ether, diethylene glycol monovinyl ether, diethylene glycol methyl vinyl ether, triethylene glycol monovinyl ether, triethylene glycol methyl vinyl ether, propylene glycol monovinyl ether, propylene glycol methyl vinyl ether, dipropylene glycol monovinyl ether, dipropylene glycol methyl vinyl ether, tripropylene glycol monovinyl ether or tripropylene glycol methyl vinyl ether.

Further, the vinyl ether compound represented by the formula (3) may, for example, be a vinyl ether such as vinyl methyl ether, vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether or vinyl n-hexyl ether; a propene such as 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene or 2-tert-butoxypropene; or a butene such as 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene or 2-tert-butoxy-2-butene. Such a vinyl ether monomer may be prepared by a known method.

The above vinyl ether compound may be produced by e.g. radical polymerization, cationic polymerization or radiation polymerization of a corresponding vinyl ether compound and a hydrocarbon monomer having an olefinic double bond used if desired. For example, a vinyl ether monomer is polymerized by the following method to obtain a polymer having a desired viscosity. To initiate polymerization, a combination of a Bronsted acid, a Lewis acid or an organic metal compound, with water, an alcohol, a phenol, an acetal or an adduct of a vinyl ether and a carboxylic acid, may be used. The Bronsted acid may, for example, be hydrofluoric acid, hydrochloric acid, hydrobromic acid, hydroiodic acid, nitric acid, sulfuric acid, trichloroacetic acid or trifluoroacetic acid. The Lewis acid may, for example, be boron trifluoride, aluminum trichloride, aluminum tribromide, tin tetrachloride, zinc dichloride or ferric chloride, and among such Lewis acids, boron trifluoride is particularly suitable. Further, the organic metal compound may, for example, be diethyl aluminum chloride, ethyl aluminum chloride or diethyl zinc.

As the water, alcohol, phenol, acetal or adduct of a vinyl ether and a carboxylic acid to be combined therewith, an optional one may be selected. The alcohol may, for example, be a $C_{1-20}$ saturated aliphatic alcohol such as methanol, ethanol, propanol, isopropanol, butanol, isobutanol, sec-butanol, tert-butanol, various forms of pentanol, various forms of hexanol, various forms of heptanol or various forms of octanol, a $C_{3-10}$ unsaturated aliphatic alcohol such as allyl alcohol, or a monoether of an alkylene glycol such as ethylene glycol monomethyl ether, diethylene glycol monomethyl ether, triethylene glycol monomethyl ether, propylene glycol monomethyl ether, dipropylene glycol monomethyl ether or tripropylene glycol monomethyl ether. In a case where an adduct of a vinyl ether and a carboxylic acid is used, the carboxylic acid may, for example, be acetic acid, propionic acid, n-butyric acid, isobutyric acid, n-valeric acid, isovaleric acid, 2-methylbutyric acid, pivalic acid, n-caproic acid, 2,2-dimethylbutyric acid, 2-methylvaleric acid, 3-methylvaleric acid, 4-methylvaleric acid, enanthic acid, 2-methylcaproic acid, caprylic acid, 2-ethylcaproic acid, 2-n-propylvaleric acid, n-nonanoic acid, 3,5,5-trimethylcaproic acid, caprylic acid or undecanoic acid.

Further, in a case where an adduct of a vinyl ether and a carboxylic acid is used, the vinyl ether may be the same as or different from one used for polymerization. The adduct of a vinyl ether and a carboxylic acid may be obtained by mixing them to allow them to react at a temperature of from about 0 to about 100° C., and the adduct may be separated e.g. by distillation and used for reaction, or it may be used for the reaction as it is without separation.

The polymerization initiation terminal of the resulting polymer has hydrogen bonded in a case where water, an alcohol or a phenol is used, and in a case where on acetal is used, it has hydrogen or one of alkoxy groups left from the acetal used. Further, in a case where an adduct of a vinyl ether and a carboxylic acid is used, it has an alkylcarbonyloxy group derived from the carboxylic acid moiety left from the adduct of a vinyl ether and a carboxylic acid.

Further, the termination terminal is an acetal, an olefin or an aldehyde in a case where water, an alcohol, a phenol or an acetal is used. Further, in the case of an adduct of a vinyl ether and a carboxylic acid, it is a carboxylate of a hemiacetal. The terminal of the polymer thus obtained may be converted into a desired group by a known method. Such a desired group may, for example, be a residue of e.g. a saturated hydrocarbon, an ether, an alcohol, a ketone, a nitrile or an amide, and is preferably a residue of a saturated hydrocarbon, an ether or an alcohol.

The polyvinyl ether compound contained in the refrigerant oil used in the present invention has a carbon/oxygen molar ratio of at least 4. If the molar ratio exceeds 4, the compatibility with the working fluid of the formula (I) will be decreased. With respect to adjustment of the molar ratio, a polymer having the molar ratio being within the above range can be produced by adjusting the carbon/oxygen molar ratio of the raw material monomer. That is, a polymer having a high carbon/oxygen molar ratio will be obtained when the proportion of a monomer having a carbon/oxygen molar ratio is high, and a polymer having a low carbon/oxygen molar ratio will be obtained when the proportion of the monomer having a low carbon/oxygen molar ratio is high. Further, the carbon/oxygen molar ratio may be adjusted also by a combination of the monomers with water, an alcohol, a phenol, an acetal or an adduct of a vinyl ether and a carboxylic acid used as the initiator, as described for the method of polymerizing the vinyl ether monomer. A polymer having a carbon/oxygen molar ratio higher than the raw material monomer will be obtained by using as the initiator an alcohol, a phenol or the like having a carbon/oxygen molar ratio higher than the monomer to be polymerized, and a polymer having a carbon/oxygen molar ratio lower than the raw material monomer will be obtained by using an alcohol having a low carbon/oxygen molar ratio such as methanol or methoxyethanol.

Further, in a case where a vinyl ether monomer and a hydrocarbon monomer having an olefinic double bond are copolymerized, a polymer having a carbon/oxygen molar ratio higher than the carbon/oxygen molar ratio of the vinyl ether monomer will be obtained, and the proportion may be adjusted by the proportion of the hydrocarbon monomer having an olefinic double bond used and its number of carbon atoms.

(Polyalkylene Glycol Refrigerant Oil)

The polyalkylene glycol refrigerant oil may, for example, be one obtained by polymerizing a $C_{2-4}$ alkylene oxide (such as ethylene oxide or propylene oxide) using water or an alkali hydroxide as an initiator. Further, it may be one having a hydroxy group of a polyalkylene glycol etherified. One molecule of the polyalkylene glycol refrigerant oil may contain single oxyalkylene units or two or more types of oxyalkylene units. It is preferred that at least oxypropylene units are contained in one molecule.

A specific polyoxyalkylene glycol refrigerant oil may, for example, be a compound represented by the following formula (4):

$$R^{101}-[(OR^{102})_k-OR^{103}]_l \quad (4)$$

wherein $R^{101}$ is a hydrogen atom, a $C_{1-10}$ alkyl group, a $C_{2-10}$ acyl group or a $C_{1-10}$ aliphatic hydrocarbon group having 2 to 6 binding sites, $R^{102}$ is a $C_{2-4}$ alkylene group, $R^{103}$ is a hydrogen atom, a $C_{1-10}$ alkyl group or a $C_{2-10}$ acyl group, l is an integer of from 1 to 6, and k is a number which makes the average of k×l from 6 to 80.

In the above formula (4), the alkyl group as each of $R^{101}$ and $R^{103}$ may be linear, branched or cyclic. The alkyl group may, for example, be specifically a methyl group, an ethyl group, a n-propyl group, an isopropyl group, various forms of a butyl group, various forms of a pentyl group, various forms of a hexyl group, various forms of a heptyl group, various forms of an octyl group, various forms of a nonyl group, various forms of a decyl group, a cyclopentyl group or a cyclohexyl group. If the number of carbon atoms in the alkyl group exceeds 10, the compatibility with the working fluid will be decreased, thus leading to phase separation. The number of carbon atoms in the alkyl group is preferably from 1 to 6.

The alkyl group moiety in the acyl group as each of $R^{101}$ and $R^{103}$ may be linear, branched or cyclic. As specific examples of the alkyl group moiety in the acyl group, various $C_{1-9}$ groups mentioned as the specific examples of the alkyl group may be mentioned. If the number of carbon atoms in the acyl group exceeds 10, the compatibility with the working fluid will be decreased, thus leading to phase separation. The number of carbon atoms in the acyl group is preferably from 2 to 6.

In a case where both $R^{101}$ and $R^{103}$ are an alkyl group or an acyl group, $R^{101}$ and $R^{103}$ may be the same or different from each other.

Further, in a case where l is at least 2, the plurality of $R^{103}$ in one molecule may be the same or different from each other.

In a case where $R^{101}$ is a $C_{1-10}$ aliphatic hydrocarbon group having from 2 to 6 binding sites, the aliphatic hydrocarbon group may be chain-like or cyclic. The aliphatic hydrocarbon group having two binding sites may, for example, be an ethylene group, a propylene group, a butylene group, a pentylene group, a hexylene group, a heptylene group, an octylene group, a nonylene group, a decylene group, a cyclopentylene group or a cyclohexylene group. Further, an aliphatic hydrocarbon group having from 3 to 6 binding sites may, for example, be trimethylolpropane, glycerin, pentaerythritol, sorbitol; 1,2,3-trihydroxycyclohexane; or a residue having a hydroxy group removed from a polyhydric alcohol such as 1,3,5-trihydroxycyclohexane.

If the number of carbon atoms in the aliphatic hydrocarbon group exceeds 10, the compatibility with the working fluid will be decreased, thus leading to a phase separation. The number of carbon atoms is preferably form 2 to 6.

$R^{102}$ in the above formula (4) is a $C_{2-4}$ alkylene group, and the oxyalkylene group as a repeating unit may be an oxyethylene group, an oxypropylene group or an oxybutylene group. One molecule of the compound of the formula (4) may contain single type of oxyalkylene groups or two or more types of oxyalkylene groups. It is preferred that at least oxypropylene units are contained in one molecule, and it is particularly preferred that at least 50 mol % of oxypropylene units are contained in oxyalkylene units.

In the above formula (4), l is an integer of from 1 to 6 and is defined depending upon the number of the binding sites of $R^{101}$. For example, in a case where $R^{101}$ is an alkyl group or an acyl group, l is 1, and in a case where $R^{101}$ is an aliphatic hydrocarbon group having 2, 3, 4, 5 or 6 binding sites, l is 2, 3, 4, 5 or 6, respectively. Further, k is a number which makes the average of k×l from 6 to 80, and if the average of k×l is out of the above range, the objects of the present invention will not sufficiently be accomplished.

The structure of the polyalkylene glycol is suitably polypropylene glycol dimethyl ether represented by the following formula (5) or poly(oxyethylene oxypropylene) glycol dimethyl ether represented by the following formula (6) in view of economical efficiency and the above-described effects, and is more preferably polypropylene glycol monobutyl ether represented by the following formula (7), further suitably polypropylene glycol monomethyl ether represented by the following formula (8), poly(oxyethylene oxypropylene) glycol monomethyl ether represented by the following formula (9), poly(oxyethylene oxypropylene) glycol monobutyl ether represented by the following formula (10) or polypropylene glycol diacetate represented by the following formula (11) in view of economical efficiency, etc.

$$CH_3O-(C_3H_6O)_h-CH_3 \quad (5)$$

(wherein h is a number of from 6 to 80)

$$CH_3O-(C_2H_4O)_i-(C_3H_6O)_j-CH_3 \quad (6)$$

(wherein each of i and j is a number of at least 1, provided that the sum of i and j is from 6 to 80)

$$C_4H_9O-(C_3H_6O)_h-H \quad (7)$$

(wherein h is a number of from 6 to 80)

$$CH_3O-(C_3H_6O)_h-H \quad (8)$$

(wherein h is a number of from 6 to 80)

$$CH_3O-(C_2H_4O)_i-(C_3H_6O)_j-H \quad (9)$$

(wherein each of i and j is a number of at least 1, provided that the sum of i and j is from 6 to 80)

$$C_4H_9O-(C_2H_4O)_i-(C_3H_6O)_j-H \quad (10)$$

(wherein each of i and j is a number of at least 1, provided that the sum of i and j is from 6 to 80)

$$CH_3COO-(C_3H_6O)_h-COCH_3 \quad (11)$$

(wherein h is a number of from 6 to 80)

Such polyoxyalkylene glycols may be used alone or in combination of two or more.

The above refrigerant oils may be used alone or in combination of two or more.

Such a refrigerant oil is preferably used as a composition for a heat cycle system as mixed with the working fluid. On that occasion, the proportion of the refrigerant oil is preferably from 5 to 60 mass %, more preferably from 10 to 50 mass % based on the entire amount of the composition for a heat cycle system.

Further, the moisture content of the refrigerant oil is not particularly limited, and is preferably at most 300 ppm, more preferably at most 200 ppm, most preferably at most 100 ppm based on the entire amount of the refrigerant oil. Particularly in a case where it is used for a closed refrigerator, a low moisture content is required from the viewpoint of the decomposition stability of the working fluid, and the influence of the refrigerant oil over the thermal/chemical stability and the electrical insulating properties. In this specification, the moisture content was measured in accordance with JIS K2275.

The remaining air partial pressure of the refrigerant oil is not particularly limited, and is preferably at most 10 kPa, more preferably at most 5 kPa.

Further, the ash of the refrigerant oil used is not particularly limited, and is preferably at most 100 ppm, more preferably at most 50 ppm, so as to increase the thermal/chemical stability of the refrigerant oil and to prevent occurrence of sludge and the like. In this specification, the ash means a value of the ash measured in accordance with JIS K2272.

<Other Optional Component>

The composition for a heat cycle system may contain a known optional component in addition within a range not to impair the effects of the present invention. Such an optional component may, for example, be an additive which makes the refrigerant oil be stably contained in the composition for a heat cycle system, and such an additive may, for example, be a copper deactivator, an extreme-pressure agent, an oil agent, an antioxidant, an acid scavenger, an antifoaming agent or a polymerization inhibitor. Each additive may be added as the case requires, and the amount of each additive is set to be at least 0.01 mass % and at most 5 mass % in 100 mass % of the composition for a heat cycle system. Here, the amount of the acid scavenger and the amount of the antioxidant are preferably within a range of at least 0.05 mass % and at most 5 mass %.

As the copper deactivator, benzotriazole, its derivative or the like may be used. As the antifoaming agent, a silicon compound may be used. As the oil agent, a higher alcohol may be used.

Further, as the extreme-pressure agent, one containing a phosphoric acid ester may be used. As the phosphoric acid ester, a phosphate, a phosphite, an acidic phosphate, an acidic phosphite or the like may be used. Further, as the extreme-pressure agent, one containing an amine salt of a phosphate, a phosphite, an acidic phosphate or an acidic phosphite may be used.

The phosphate may, for example, be triaryl phosphate, trialkyl phosphate, trialkyl aryl phosphate, triaryl alkyl phosphate or trialkenyl phosphate. Further, the phosphate may, for example, be specifically triphenyl phosphate, tricresyl phosphate, benzyl diphenyl phosphate, ethyl diphenyl phosphate, tributyl phosphate, ethyl dibutyl phosphate, cresyl diphenyl phosphate, dicresyl phenyl phosphate, ethylphenyl diphenyl phosphate, diethylphenyl phenyl phosphate, propylphenyl diphenyl phosphate, dipropylphenyl phenyl phosphate, triethylphenyl phosphate, tripropylphenyl phosphate, butylphenyl diphenyl phosphate, dibutylphenyl phenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate or trioleyl phosphate.

Further, the phosphite may, for example, be specifically triethyl phosphite, tributyl phosphite, triphenyl phosphite, tricresyl phosphite, tri(nonylphenyl) phosphite, tri(2-ethylhexyl) phosphite, tridecyl phosphite, trilauryl phosphite, triisooctyl phosphite, diphenyl isodecyl phosphite, tristearyl phosphite or trioleyl phosphite.

Further, the acidic phosphate may, for example, be 2-ethylhexylacid phosphate, ethyl acid phosphate, butyl acid phosphate, oleyl acid phosphate, tetracosyl acid phosphate, isodecyl acid phosphate, lauryl acid phosphate, tridecyl acid phosphate, stearyl acid phosphate or isostearyl acid phosphate.

Further, the acidic phosphite may, for example, be dibutyl hydrogen phosphite, dilauryl hydrogen phosphite, dioleyl hydrogen phosphite, distearyl hydrogen phosphite or diphenyl hydrogen phosphite. Among the above phosphoric acid esters, oleyl acid phosphate or stearyl acid phosphate is suitable.

Further, among amines to be used for the amine salt of a phosphate, a phosphite, an acidic phosphate or an acidic phosphite, a mono-substituted amine may, for example, be specifically butylamine, pentylamine, hexylamine, cyclohexylamine, octylamine, laurylamine, stearylamine, oleylamine or benzylamine. Further, a di-substituted amine may, for example, be specifically dibutylamine, dipentylamine, dihexylamine, dicyclohexylamine, dioctylamine, dilaurylamine, distearylamine, dioleylamine, dibenzylamine, stearyl monoethanolamine, decyl monoethanolamine, hexyl monopropanolamine, benzyl monoethanolamine, phenyl monoethanolamine or tolyl monopropanol. Further, a tri-substituted amine may, for example, be specifically tributylamine, tripentylamine, trihexylamine, tricyclohexylamine, trioctylamine, trilaurylamine, tristearylamine, trioleylamine, tribenzylamine, dioleyl monoethanolamine, dilauryl monopropanolamine, dioctyl monoethanolamine, dihexyl monopropanolamine, dibutyl monopropanolamine, oleyl diethanolamine, stearyl dipropanolamine, lauryl diethanolamine, octyl dipropanolamine, butyl diethanolamine, benzyl diethanolamine, phenyl diethanolamine, tolyl dipropanolamine, xylyl diethanolamine, triethanolamine or tripropanolamine.

Further, an extreme-pressure agent other than the above may be added. For example, it is possible to use an organic sulfur-containing compound type extreme-pressure agent such as a monosulfide, a polysulfide, a sulfoxide, a sulfone, a thiosulfinate, a sulfurised oil, a thiocarbonate, a thiophene, a thiazole or a methanesulfonate, a thiophosphate type extreme-pressure agent such as a thiophosphoric acid triester, an ester type extreme-pressure agent such as a higher fatty acid, a hydroxyaryl fatty acid, a polyhydric alcohol ester or an acrylate, an organic chlorine type extreme-pressure agent such as a chlorinated hydrocarbon or a chlorinated carboxylic acid derivative, an organic fluorinated compound type extreme-pressure agent such as a fluorinated aliphatic carboxylic acid, a fluorinated ethylene resin, a fluorinated alkylpolysiloxane or fluorinated graphite, an alcohol type extreme-pressure agent such as a higher alcohol, or a metal compound type extreme-pressure agent such as a naphthenate (such as lead naphthenate) a fatty acid salt (such as fatty acid lead salt), a thiophosphate (such as zinc dialkyldithiophosphate), a thiocarbamate, an organic molybdenum compound, an organic tin compound, an organic germanium compound or a borate ester.

Further, as the antioxidant, a phenol type antioxidant or an amine type antioxidant may be used. The phenol type antioxidant may, for example, be 2,6-di-tert-butyl-4-methylphenol (DBPC), 2,6-di-tert-butyl-4-ethylphenol, 2,2'-methylenebis(4-methyl-6-tert-butylphenol), 2,4-dimethyl-6-tert-butylphenol or 2,6-di-tert-butylphenol. Further, the amine type antioxidant may, for example, be N,N'-diisopropyl-p-phenylenediamine, N,N'-di-sec-butyl-p-phenylenediamine, N-phenyl-1-naphthylamine or N,N'-diphenyl-p-phenylenediamine. Further, for the antioxidant, an acid scavenger to scavenge oxygen may also be used.

As the acid scavenger, an epoxy compound such as phenyl glycidyl ether, an alkyl glycidyl ether, an alkylene glycol glycidyl ether, cyclohexene oxide, an α-olefin oxide or epoxidized soybean oil may be used. Among them, from the viewpoint of the compatibility, preferred as an acid scavenger is phenyl glycidyl ether, an alkyl glycidyl ether, an alkylene glycol glycidyl ether, cyclohexene oxide or an α-olefin oxide. The alkyl group in the alkyl glycidyl ether and the alkylene group in the alkylene glycol glycidyl ether may be branched. The number of carbon atoms in such a compound is at least 3 and at most 30, preferably at least 4 and at most 24, further preferably at least 6 and at most 16. Further, the total number of carbon atoms in the α-olefin oxide is at least 4 and at most 50, preferably at least 4 and at most 24, more preferably at least 6 and at most 16. Such acid scavengers may be used alone or in combination of two or more.

Further, as the polymerization inhibitor, a polymerization inhibitor such as 4-methoxy-1-naphthol, hydroquinone, hydroquinone methyl ether, dimethyl-tert-butyl phenol, 2,6-di-tert-butyl-p-cresole or benzotriazole may be used.

Further, to the composition for a heat cycle system according to this embodiment, as the case requires, a load-carrying additive, an oxygen scavenger, a chlorine scavenger, a detergent-dispersant, a viscosity index improver, an anticorrosive, a stabilizer, a corrosion inhibitor, a pour-point depressant or the like may be added. The oxygen scavenger is an additive to scavenge oxygen. The amount of each additive is at least 0.01 mass % and at most 5 mass %, preferably at least 0.05 mass % and at most 2 mass % in 100 mass % of the composition for a heat cycle system.

Further, as an optional component to be blended in the composition for a heat cycle system, for example, a leak detecting substance may be mentioned, and such a leak detecting substance optionally contained may, for example, be an ultraviolet fluorescent dye, an odor gas or an odor masking agent.

The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The content of the leak detecting substance in the composition for a heat cycle system is not particularly limited within a range not to remarkably decrease the effects of the present invention, and is preferably at most 2 parts by the mass, more preferably at most 0.5 part by the mass per 100 parts by the mass of the working fluid.

[Heat Cycle System]

The heat cycle system of the present invention is a system employing the composition for a heat cycle system of the present invention. The heat cycle system of the present invention may be a heat pump system utilizing heat obtained by a condenser or may be a refrigerating cycle system utilizing coldness obtained by an evaporator.

The heat cycle system of the present invention may, for example, be specifically a refrigerator, an air-conditioning apparatus, a power generation system, a heat transfer apparatus and a secondary cooling machine. Among them, the heat cycle system of the present invention, which efficiently exhibits heat cycle performance in a working environment at higher temperature, is preferably employed as an air-conditioning apparatus to be disposed outdoors in many cases. Further, the heat cycle system of the present invention is preferably employed also for a refrigerator.

The air-conditioning apparatus may, for example, be specifically a room air-conditioner, a package air-conditioner (such as a store package air-conditioner, a building package air-conditioner or a plant package air-condition, a gas engine heat pump, a train air-conditioning system or an automobile air-conditioning system.

The refrigerator may, for example, be specifically a showcase (such as a built-in showcase or a separate showcase), an industrial fridge freezer, a vending machine or an ice making machine.

The power generation system is preferably a power generation system by Rankine cycle system.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Further, the heat cycle system of the present invention may be a heat transport apparatus. The heat transport apparatus is preferably a latent heat transport apparatus.

The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

Now, as an example of the heat cycle system according the embodiment of the present invention, a refrigerating cycle system will be described with reference to a refrigerating cycle system 10 which has been roughly described above, of which the schematic construction view is shown in FIG. 1, as an example. A refrigerating cycle system is a system utilizing coldness obtained by an evaporator.

A refrigerating cycle system 10 shown in FIG. 1 is a system generally comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12.

In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in the evaporator 14 to form a high temperature/low pressure working fluid vapor A. At that time, the load fluid E is cooled and becomes a load fluid E', which is discharged from the evaporator 14 (hereinafter referred to as "DA process").

The refrigerating cycle system 10 is a cycle system comprising an adiabatic isentropic change, an isenthalpic change and an isobaric change. The state change of the working fluid, as represented on a pressure enthalpy chart (curve) as shown in FIG. 2, may be represented as a trapezoid having points A, B, C and D as vertexes.

Figure 2:
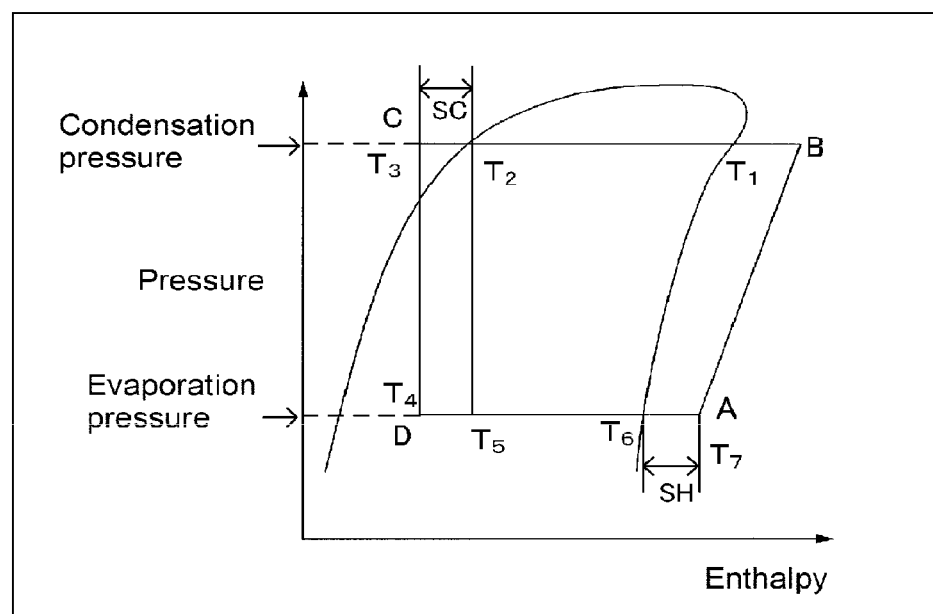
FIG. 2 is a cycle diagram illustrating the state change of a working fluid in a refrigerating cycle system in FIG. 1 on a pressure-enthalpy chart.

The AB process is a process wherein adiabatic compression is carried out by the compressor 11 to change the high temperature/low pressure working fluid vapor A to a high temperature/high pressure working fluid vapor B, and is represented by the line AB in FIG. 2.

The BC process is a process wherein isobaric cooling is carried out in the condenser 12 to change the high temperature/high pressure working fluid vapor B to a low temperature/high pressure working fluid C and is represented by the BC line in FIG. 2. The pressure in this process is the condensation pressure. Of the two intersection points of the pressure enthalpy chart and the BC line, the intersection point $T_1$ on the high enthalpy side is the condensing temperature, and the intersection point $T_2$ on the low enthalpy side is the condensation boiling point temperature. Here, in a case where the working fluid is a single compound or an azeotropic mixture, $T_1$ and $T_2$ are equal to each other. In a case where the working fluid is a non-azeotropic mixture, $T_1$ and $T_2$ are different from each other. In the present invention, in such a case, the higher temperature between $T_1$ and $T_2$ is taken as the "condensing temperature". Further, the temperature glide in the case of a non-azeotropic mixture fluid is represented by the difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 2. $T_2$-$T_3$ corresponds to the supercooling degree (hereinafter referred to as "SC" as the case requires) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 2. The pressure in this process is the evaporation pressure. Of the two intersection points of the pressure enthalpy chart and the DA line, the intersection point $T_6$ on the high enthalpy side is the evaporation temperature. $T_7$-$T_6$ corresponds to the degree of superheat (hereinafter referred to as "SH" as the case requires) of the working fluid in the cycle of (i) to (iv), where $T_7$ is the temperature of the working fluid vapor A. $T_4$ indicates the temperature of the working fluid D. Here, in a case where the working fluid is a single compound or an azeotropic mixture, $T_4$ and $T_6$ are equal to each other. In a case where the working fluid is a non-azeotropic mixture, $T_4$ and $T_6$ are different from each other. In the present invention, in such a case, the lower temperature between $T_4$ and $T_6$ is taken as the "evaporation temperature".

Here, cycle performance of the working fluid is evaluated, for example, by the refrigerating capacity (hereinafter referred to as "Q" as the case requires) and the coefficient of performance (hereinafter referred to as "COP" as the case requires) of the working fluid. Q and COP of the working fluid are obtained respectively in accordance with the following formulae (A) and (B) from enthalpies $h_A$, $h_B$, $h_C$ and $h_D$ in the respective states A (after evaporation, high temperature and low pressure), B (after compression, high temperature and high pressure), C (after condensation, low temperature and high pressure) and D (after expansion, low temperature and low pressure) of the working fluid:

$$Q = h_A - h_D \tag{A}$$

$$COP = Q/\text{compression work} = (h_A - h_D)/(h_B - h_A) \tag{B}$$

COP means the efficiency in the refrigerating cycle system, and a higher COP means that a higher output, for example, Q, can be obtained by a smaller input, for example, an electric energy required to operate a compressor.

Further, Q means a capacity to freeze a load fluid, and a higher Q means that more works can be done in the same system. In other words, it means that with a working fluid having a higher Q, the desired performance can be obtained with a smaller amount, whereby the system can be downsized.

In the heat cycle system of the present invention employing the composition for a heat cycle system of the present invention, in a refrigerating cycle system 10 shown in FIG. 1 for example, as compared with a case where R410 (a mixed fluid of HFC-32 and HFC-125 in a mass ratio of 1:1) which has been commonly used for an air-conditioning apparatus or the like, it is possible to achieve high levels of Q and COP, i.e. equal to or higher than those of R410A, while remarkably suppressing the global worming potential.

Further, since the working fluid contained in the composition for a heat cycle system to be employed may have a composition with which the temperature glide of the working fluid is suppressed to a certain level or lower, and in such a case, the composition change when the composition for a heat cycle system is put into a refrigerator or an air-conditioning apparatus from a pressure container and a change in the refrigerant composition in a refrigerator or an air-conditioning apparatus when the refrigerant leaks out from the refrigerator or the air-conditioning apparatus, can be suppressed to lower levels. Further, according to the composition for a heat cycle system of the present invention, the lubricating properties of the fluorinated hydrocarbon compound contained as the working fluid are improved, and accordingly a heat cycle system employing the composition can maintain a more efficient circulation state of the working fluid as compared with a conventional system, and can be stably operated.

In the heat cycle system, as described above, since the working fluid used in the present invention contains a carbon-carbon double bond, the working fluid may be decomposed to generate an acid at the time of operation of the system. In the present invention, a refrigerant oil is used in combination with the working fluid to suppress generation of an acid, however, it is preferred to constitute the heat cycle system so as to be stably operated even if an acid is generated by some reasons.

That is, the contact portion to be in contact with the composition for a heat cycle system is preferably composed of at least one member selected from an engineering plastic, an organic film and an inorganic film. As the contact portion, particularly, a slide member in a case where the system has a compression mechanism, a sealing member in the interior of the heat cycle system, and the like, may be mentioned as members to be protected. More particularly, a slide member (such as a bearing) provided at a slide portion of a compressor, a sealing member to prevent leakage of the working fluid from the compressor, an insulating material provided on an electric motor, etc. may be mentioned.

The engineering plastic used is preferably at least one member selected from a polyamide resin, a polyphenylene sulfide resin, a polyacetal resin and a fluororesin.

Further, the organic film used is preferably at least one film selected from a polytetrafluoroethylene-coated film, a polyimide-coated film, a polyamideimide-coated film, and a thermosetting insulating film formed by using a resin coating composition containing a resin comprising a polyhydroxy ether resin and a polysulfone resin, and a crosslinking agent.

Further, the inorganic film used is at least one film selected from a graphite film, a diamond-like carbon film, a tin film, a chromium film, a nickel film and a molybdenum film.

Further, in a case where the contact portion is a slide member, for example, it is preferred to use any one of polytetrafluoroethylene, polyphenylene sulfide and polyamide, and in a case where it is a sealing portion, for example, it is preferably made of at least one member selected from polytetrafluoroethylene, polyphenylene sulfide, chloroprene rubber, silicon rubber, hydrogenated nitrile rubber, fluorocarbon rubber and epichlorohydrin rubber.

Further, as the insulating material of an electric motor, an insulating covering material for a stator coil, an insulating film and the like may be mentioned. Such an insulating covering material and an insulating film are made of a resin which will not be degenerated physically or chemically, even when brought into contact with a working fluid at high temperature under high pressure, by the working fluid, particularly a resin having solvent resistance, extraction resistance, thermal/chemical stability and bubbling resistance.

Specifically, for an insulating covering material for a stator coil, any one of polyvinyl formal, polyester, THEIC-modified polyester, polyimide, polyamideimide, polyesterimide and polyesteramideimide is used. Preferred is a double coated wire consisting of polyamideimide as an upper layer and polyesterimide as a lower layer. Further, in addition to the above material, an enamel covering with a glass transition temperature of at least 120° C. may be used.

Further, for an insulating film, any one of polyethylene terephthalate (PET), polyethylene naphthalate (PEN), polyphenylene sulfide (PPS) and polybutylene terephthalate (PBT) is used. Further, for the insulating film, it is possible to use a foamed film of which the foamed material is the same as the working fluid for a refrigerating cycle. For an insulating material to hold a coil such as an insulator, polyether ether ketone (PEEK) or a liquid crystal polymer (LCP) is used. For varnish, an epoxy resin is used.

At the time of operation of the heat cycle system, in order to avoid drawbacks due to inclusion of moisture or inclusion of non-condensing gas such as oxygen, it is preferred to provide a means to suppress such inclusion.

If moisture is included in the heat cycle system, a problem may occur particularly when the heat cycle system is used at low temperature. For example, problems such as freezing in a capillary tube, hydrolysis of the working fluid or the refrigerant oil, deterioration of materials by an acid component formed in the cycle, formation of contaminants, etc. may arise. Particularly, if the refrigerant oil is a polyglycol refrigerant oil or a polyol ester refrigerant oil, it has extremely high moisture absorbing properties and is likely to undergo hydrolysis, and inclusion of moisture decreases properties of the refrigerant oil and may be a great cause to impair the long term reliability of a compressor. Accordingly, in order to suppress hydrolysis of the refrigerant oil, it is necessary to control the moisture concentration in the heat cycle system.

As a method of controlling the moisture concentration in the heat cycle system, a method of using a moisture-removing means such as a desiccating agent (such as silica gel, activated aluminum or zeolite) may be mentioned. The desiccating agent is preferably brought into contact with the composition for a heat cycle system in a liquid state, in view of the dehydration efficiency. For example, the desiccating agent is located at the outlet of the condenser 12 or at the inlet of the evaporator 14 to be brought into contact with the composition for a heat cycle system.

The desiccating agent is preferably a zeolite desiccating agent in view of chemical reactivity of the desiccating agent and the composition for a heat cycle system, and the moisture absorption capacity of the desiccating agent.

The zeolite desiccating agent is, in a case where a refrigerant oil having a large moisture absorption as compared with a conventional mineral refrigerant oil is used, preferably a zeolite desiccating agent containing a compound represented by the following formula (C) as the main component in view of excellent moisture absorption capacity.

$$M_{2/n}O \cdot Al_2O_3 \cdot xSiO_2 \cdot yH_2O \tag{C}$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are important.

In a case where a desiccating agent having a pore size larger than the molecular size of the working fluid and the refrigerant oil contained in the composition for a heat cycle system is used, the working fluid and the refrigerant oil is adsorbed in the desiccating agent and as a result, chemical reaction between the working fluid and the refrigerant oil and the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid and the refrigerant oil, it is possible to selectively adsorb and remove only moisture in the heat cycle system without adsorbing the working fluid and the refrigerant oil. In other words, the working fluid and the refrigerant oil are less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from about 0.5 to about 5 mm, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

The proportion of the zeolite desiccating agent based on the composition for a heat cycle system is not particularly limited.

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the refrigerant oil and promotes their decomposition.

The non-condensing gas concentration is preferably at most 1.5 vol %, particularly preferably at most 0.5 vol % by the volume ratio based on the working fluid, in a gaseous phase of the working fluid.

According to the above-described heat cycle system of the present invention, which employs the composition for a heat cycle system of the present invention, favorable lubricating properties are achieved, practically sufficient heat cycle performance can be obtained while suppressing influence over global warming, and there is substantially no problem with respect to the temperature glide.

EXAMPLES

Now, the present invention will be described in further detail with reference to Examples of the present invention, conventional Examples and Comparative Examples. In each Ex., one of the following working fluids 1 to 64 and one of the following refrigerant oils A to I were selected, 50 g of the working fluid and 50 g of the refrigerant oil were mixed and dissolved to prepare 576 types of composition for a heat cycle system. Accordingly, the composition for a heat cycle system in Ex. is one comprising 50 mass % of the working fluid and 50 mass % of the refrigerant oil. Further, for some working fluids, an antioxidant was added to constitute the composition for a heat cycle system, as described hereinafter.

The following working fluids and refrigerant oils were used. Compounds constituting the working fluids are shown in Table 2, and compounds constituting the refrigerant oils are shown in Table 3.

TABLE 2

| Working fluid | HFO-1123 | HFC-32 | HFO-1234yf | HFC-134a | HFC-152a | HFC-125 |
|---|---|---|---|---|---|---|
| 1 | 100 | | | | | |
| 2 | 20 | 80 | | | | |
| 3 | 40 | 60 | | | | |
| 4 | 50 | 50 | | | | |
| 5 | 60 | 40 | | | | |
| 6 | 80 | 20 | | | | |
| 7 | 30 | 40 | 30 | | | |
| 8 | 50 | | | | 50 | |
| 9 | 50 | | 50 | | | |
| 10 | 50 | | | | | 50 |
| 11 | | 50 | | | | 50 |
| 12 | 50 | 40 | 10 | | | |
| 13 | 40 | 40 | 20 | | | |
| 14 | 20 | 40 | 40 | | | |
| 15 | 10 | 40 | 50 | | | |
| 16 | 40 | 50 | 10 | | | |
| 17 | 30 | 50 | 20 | | | |
| 18 | 20 | 50 | 30 | | | |
| 19 | 10 | 50 | 40 | | | |
| 20 | 30 | 60 | 10 | | | |
| 21 | 20 | 60 | 20 | | | |
| 22 | 10 | 60 | 30 | | | |
| 23 | 20 | 70 | 10 | | | |
| 24 | 10 | 70 | 20 | | | |
| 25 | 40 | 10 | 50 | | | |
| 26 | 50 | 10 | 40 | | | |
| 27 | 60 | 10 | 30 | | | |
| 28 | 70 | 10 | 20 | | | |
| 29 | 80 | 10 | 10 | | | |
| 30 | 40 | 20 | 40 | | | |
| 31 | 50 | 20 | 30 | | | |
| 32 | 60 | 20 | 20 | | | |
| 33 | 70 | 20 | 10 | | | |
| 34 | 60 | 30 | 10 | | | |
| 35 | 50 | 30 | 20 | | | |
| 36 | 40 | 30 | 30 | | | |
| 37 | 30 | 30 | 40 | | | |
| 38 | 40 | 55 | 5 | | | |
| 39 | 40 | 45 | 15 | | | |
| 40 | 40 | 35 | 25 | | | |

TABLE 2-continued

| | mass % | | | | | |
|---|---|---|---|---|---|---|
| Working fluid | HFO-1123 | HFC-32 | HFO-1234yf | HFC-134a | HFC-152a | HFC-125 |
| 41 | 45 | 50 | 5 | | | |
| 42 | 45 | 45 | 10 | | | |
| 43 | 45 | 40 | 15 | | | |
| 44 | 45 | 35 | 20 | | | |
| 45 | 45 | 30 | 25 | | | |
| 46 | 45 | 25 | 30 | | | |
| 47 | 50 | 45 | 5 | | | |
| 48 | 50 | 35 | 15 | | | |
| 49 | 50 | 25 | 25 | | | |
| 50 | 55 | 40 | 5 | | | |
| 51 | 55 | 35 | 10 | | | |
| 52 | 55 | 30 | 15 | | | |
| 53 | 55 | 25 | 20 | | | |
| 54 | 55 | 20 | 25 | | | |
| 55 | 55 | 15 | 30 | | | |
| 56 | 30 | 45 | 25 | | | |
| 57 | 30 | 55 | 15 | | | |
| 58 | 30 | 65 | 5 | | | |
| 59 | 35 | 35 | 30 | | | |
| 60 | 35 | 40 | 25 | | | |
| 61 | 35 | 45 | 20 | | | |
| 62 | 35 | 50 | 15 | | | |
| 63 | 35 | 55 | 10 | | | |
| 64 | 35 | 60 | 5 | | | |

Refrigerant oil A: polyol ester refrigerant oil (tradename: UNISTER RH-208BRS, manufactured by NOF CORPORATION)
Refrigerant oil B: polyol ester refrigerant oil (tradename: UNISTER RH-481 R, manufactured by NOF CORPORATION)
Refrigerant oil C: polyol ester refrigerant oil (tradename: UNISTER RHR-32, manufactured by NOF CORPORATION)
Refrigerant oil D: polyol ester refrigerant oil (tradename: UNISTER RHR-64, manufactured by NOF CORPORATION)
Refrigerant oil E: polyol ester refrigerant oil (tradename: UNISTER RHR-200, manufactured by NOF CORPORATION)
Refrigerant oil F: polyol ester refrigerant oil (tradename: UNISTER RHR-609BR, manufactured by NOF CORPORATION)
Refrigerant oil G: refrigerant oil containing a polyol ester as the main component (tradename: Ze-GLES RB-68, manufactured by J X Nippon Oil & Energy Corporation)
Refrigerant oil H: refrigerant oil containing a polyvinyl ether as the main component (tradename: Daphne Hermetic Oil FVC68D, manufactured by Idemitsu Kosan Co., Ltd.)
Refrigerant oil I: naphthene type higher refrigerant oil (tradename: SUNISO 4GS, manufactured by Idemitsu Kosan Co., Ltd.)

TABLE 3

| | Refrigerant oil: tradename | Hydroxy value mg KOH/g | Flash point [° C.] | Kinematic viscosity (mm$^2$/s) 40° C. | Kinematic viscosity (mm$^2$/s) 100° C. | Viscosity index [—] | Pour point [° C.] | Breakdown voltage [kV] |
|---|---|---|---|---|---|---|---|---|
| A | UNISTER RH-208BRS | 0.10 | 168 | 8 | 2 | 52 | −50 | >25 |
| B | UNISTER RH-481R | 0.50 | 330 | 65 | 12 | 191 | −20 | >50 |
| C | UNISTER RHR-32 | 0.10 | 273 | 34 | 6 | 114 | −50 | >50 |
| D | UNISTER RHR-64 | 0.10 | 283 | 65 | 9 | 113 | −38 | >50 |
| E | UNISTER RHR-200 | 0.10 | 298 | 235 | 18 | 81 | −30 | >25 |
| F | UNISTER RHR-609BR | 0.30 | 302 | 462 | 28 | 85 | −18 | >25 |
| G | Ze-GLES RB-68 | 0.01 | 255 | 65 | 8 | 90 | −40 | >50 |
| H | FVC68D | 0.01 | 206 | 66 | 8 | 84 | −37 | 74 |
| I | 4GS | 0.00 | 188 | 54 | 6 | — | −35 | 50 |

Further, for each of the refrigerant oils A to F, as an additive, an antioxidant (2,6-di-tert-butyl-4-methylphenol) was added in an amount of 0.5 mass % per 100 mass % of the total amount of the refrigerant oil and the antioxidant, to form a refrigerant oil composition, which was used for production and was evaluated. In the following test examples, even in a case where such a refrigerant oil composition was used, the refrigerant oil composition was represented as "refrigerant oil".

[Tests]

(Compatibility with Working Fluid)

Using the above-described working fluid and refrigerant oil, the compatibility of each test oil with the working fluid was evaluated in accordance with the method of test for the determination of compatibility with refrigerant in JIS K 2211 "Refrigerant oils". The working fluid and the refrigerant oil were blended in a proportion of the refrigerant oil of 15 mass %, and the phase separation state was visually confirmed at −60° C. and at 35° C. and evaluated based on the following standards.

◯: The working fluid and the refrigerant oil were compatible with each other at both temperatures.

Δ: The working fluid and the refrigerant oil became turbid at both temperatures.

X: The working fluid and the refrigerant oil were separated from each other at both temperatures.

(Aniline Point of Refrigerant Oil)

Using the above refrigerant oil, the aniline point of each test oil was evaluated in accordance with JIS K2256 "Petroleum products-determination of aniline point and mixed aniline point". Aniline and the refrigerant oil were blended in a mass ratio of 50 mass %:50 mass %, the obtained mixture was cooled from 0° C. to −100° C., and the phase separation state was visually confirmed and evaluated based on the following standards.

◯: There was an aniline point within a range of from −100 to 0° C.

x: There was no aniline point within a range of from −100 to 0° C.

(Weight Change by Immersion Test)

The test was carried out in accordance with JIS K7114 "Plastics-Methods of test for the determination of the effects of immersion in liquid chemicals". The composition for a heat cycle system was put in a 200 ml stainless steel pressure resistant container in which a 150 ml glass tube was put, and about 10 g of a nylon-11 test specimen was put, and the container was closed. Then, the closed pressure resistant container was stored in a constant temperature chamber (perfect oven PHH-202, manufactured by ESPEC CORP.) at 175° C. for 14 days, and the weight change of the test specimen was confirmed and evaluated based on the following standards.

◯: No mass change of 1% or more.

x: Mass change of 1% or more confirmed.

A mass change indicates that the resin swelled by the immersion test.

(Circulation State of Refrigerant Oil)

Each composition for a heat cycle system was introduced into a heat cycle system 10 shown in FIG. 1, and the heat cycle system was continuously operated. To evaluate the circulation state of the composition for a heat cycle system, part of a flow path from an evaporator 14 to a compressor 11 in the heat cycle system was constituted by a glass pipe. Through the glass pipe, the interior was observed to evaluate the circulation state of the composition for a heat cycle system in the heat cycle system. The circulation state was visually evaluated based on the following standards.

◯: Circulation of the refrigerant oil was confirmed.

Δ: Although circulation of the refrigerant oil was confirmed, the circulation amount was slightly small.

x: Circulation of the refrigerant oil was not confirmed.

(Stability Test)

The stability test was carried out in accordance with the method of test for chemical stability of refrigerant and refrigerant oil (autoclave) described in JIS K2211. The composition for a heat cycle system was put in a 200 ml stainless steel pressure resistant container in which a 150 ml glass tube was put, and as a catalyst, iron, copper and aluminum test specimens were put in one pressure resistant container, and the container was closed. Then, the closed pressure resistant container was stored in a constant temperature chamber (perfect oven PHH-202, manufactured by ESPEC CORP.) at 175° C. for 14 days, and the acid content in the working fluid was measured, the hue of the refrigerant oil was observed, and a change of the outer appearance of the catalyst was observed, as follows.

Further, as the metal specimens as the catalyst, the following were used.

a) Iron: a test specimen of cold-reduced carbon steel sheet (as stipulated in JIS G3141, SPCC-SB), 30 mm×25 mm×3.2 mm in thickness b) Copper: a test specimen of tough pitch copper (as stipulated in JIS H3100, alloy number C1100, C1100P), 30 mm×25 mm×2 mm in thickness c) Aluminum: a test specimen of pure aluminum (as stipulated in JIS H4000, alloy number 1050, A1050P), 30 mm×25 mm×2 mm in thickness (Hue of Refrigerant Oil)

After the stability test, the refrigerant oil remaining in the pressure resistant container from which the working fluid had been withdrawn, was taken out, and the hue of the refrigerant oil was evaluated in accordance with ASTM-D156.

◯: No change observed.

X: Coloring proceeded.

In a case where coloring proceeded, the composition for a heat cycle system was deteriorated by the stability test.

(Change of Outer Appearance of Catalyst)

The outer appearance of the catalyst metal after the stability test was visually confirmed, and the change of the outer appearance of the catalyst was evaluated based on the following standards.

◯: No change was confirmed.

x: Gloss of the catalyst disappeared or the catalyst blackened.

In a case where the gloss of the catalyst disappeared or the catalyst blackened, the composition for a heat cycle system was deteriorated by the stability test.

(Sludge)

Presence or absence of sludge was evaluated based on the following standards by visually observing the container after the stability test.

◯: No sludge observed.

X: Sludge observed.

In a case where sludge was observed, the composition for a heat cycle system underwent decomposition of some kind or polymerization reaction by the stability test.

[Test Results]

(Compatibility with Working Fluid)

The results are shown in Tables 4 and 5. Only the refrigerant oil I was separated from the working fluid, and favorable compatibility of polyol ester and polyvinyl ether refrigerant oils was confirmed. However, no remarkable difference among the types of the working fluid was confirmed, and the same result as the working fluid 11 (R-410A) which is a commercially available composition was obtained. However, refrigerant oils E and F which had a high kinematic viscosity tended to become turbid even though they were polyol ester type.

TABLE 4

| Working fluid | Refrigerant oil | | | | | | | | |
|---|---|---|---|---|---|---|---|---|---|
| | A | B | C | D | E | F | G | H | I |
| 1 | ○ | ○ | ○ | ○ | △ | △ | ○ | ○ | X |
| 2 | ○ | ○ | ○ | ○ | △ | △ | ○ | ○ | X |
| 3 | ○ | ○ | ○ | ○ | △ | △ | ○ | ○ | X |
| 4 | ○ | ○ | ○ | ○ | △ | △ | ○ | ○ | X |
| 5 | ○ | ○ | ○ | ○ | △ | △ | ○ | ○ | X |
| 6 | ○ | ○ | ○ | ○ | △ | △ | ○ | ○ | X |
| 7 | ○ | ○ | ○ | ○ | △ | △ | ○ | ○ | X |
| 8 | ○ | ○ | ○ | ○ | △ | △ | ○ | ○ | X |
| 9 | ○ | ○ | ○ | ○ | △ | △ | ○ | ○ | X |
| 10 | ○ | ○ | ○ | ○ | △ | △ | ○ | ○ | X |
| 11 | ○ | ○ | ○ | ○ | △ | △ | ○ | ○ | X |
| 12 | ○ | ○ | ○ | ○ | △ | △ | ○ | ○ | X |
| 13 | ○ | ○ | ○ | ○ | △ | △ | ○ | ○ | X |
| 14 | ○ | ○ | ○ | ○ | △ | △ | ○ | ○ | X |
| 15 | ○ | ○ | ○ | ○ | △ | △ | ○ | ○ | X |
| 16 | ○ | ○ | ○ | ○ | △ | △ | ○ | ○ | X |
| 17 | ○ | ○ | ○ | ○ | △ | △ | ○ | ○ | X |
| 18 | ○ | ○ | ○ | ○ | △ | △ | ○ | ○ | X |
| 19 | ○ | ○ | ○ | ○ | △ | △ | ○ | ○ | X |
| 20 | ○ | ○ | ○ | ○ | △ | △ | ○ | ○ | X |
| 21 | ○ | ○ | ○ | ○ | △ | △ | ○ | ○ | X |
| 22 | ○ | ○ | ○ | ○ | △ | △ | ○ | ○ | X |
| 23 | ○ | ○ | ○ | ○ | △ | △ | ○ | ○ | X |
| 24 | ○ | ○ | ○ | ○ | △ | △ | ○ | ○ | X |
| 25 | ○ | ○ | ○ | ○ | △ | △ | ○ | ○ | X |
| 26 | ○ | ○ | ○ | ○ | △ | △ | ○ | ○ | X |
| 27 | ○ | ○ | ○ | ○ | △ | △ | ○ | ○ | X |
| 28 | ○ | ○ | ○ | ○ | △ | △ | ○ | ○ | X |
| 29 | ○ | ○ | ○ | ○ | △ | △ | ○ | ○ | X |
| 30 | ○ | ○ | ○ | ○ | △ | △ | ○ | ○ | X |
| 31 | ○ | ○ | ○ | ○ | △ | △ | ○ | ○ | X |
| 32 | ○ | ○ | ○ | ○ | △ | △ | ○ | ○ | X |

TABLE 5

| Working fluid | Refrigerant oil | | | | | | | | |
|---|---|---|---|---|---|---|---|---|---|
| | A | B | C | D | E | F | G | H | I |
| 33 | ○ | ○ | ○ | ○ | △ | △ | ○ | ○ | X |
| 34 | ○ | ○ | ○ | ○ | △ | △ | ○ | ○ | X |
| 35 | ○ | ○ | ○ | ○ | △ | △ | ○ | ○ | X |
| 36 | ○ | ○ | ○ | ○ | △ | △ | ○ | ○ | X |
| 37 | ○ | ○ | ○ | ○ | △ | △ | ○ | ○ | X |
| 38 | ○ | ○ | ○ | ○ | △ | △ | ○ | ○ | X |
| 39 | ○ | ○ | ○ | ○ | △ | △ | ○ | ○ | X |
| 40 | ○ | ○ | ○ | ○ | △ | △ | ○ | ○ | X |
| 41 | ○ | ○ | ○ | ○ | △ | △ | ○ | ○ | X |
| 42 | ○ | ○ | ○ | ○ | △ | △ | ○ | ○ | X |
| 43 | ○ | ○ | ○ | ○ | △ | △ | ○ | ○ | X |
| 44 | ○ | ○ | ○ | ○ | △ | △ | ○ | ○ | X |
| 45 | ○ | ○ | ○ | ○ | △ | △ | ○ | ○ | X |
| 46 | ○ | ○ | ○ | ○ | △ | △ | ○ | ○ | X |
| 47 | ○ | ○ | ○ | ○ | △ | △ | ○ | ○ | X |
| 48 | ○ | ○ | ○ | ○ | △ | △ | ○ | ○ | X |
| 49 | ○ | ○ | ○ | ○ | △ | △ | ○ | ○ | X |
| 50 | ○ | ○ | ○ | ○ | △ | △ | ○ | ○ | X |
| 51 | ○ | ○ | ○ | ○ | △ | △ | ○ | ○ | X |
| 52 | ○ | ○ | ○ | ○ | △ | △ | ○ | ○ | X |
| 53 | ○ | ○ | ○ | ○ | △ | △ | ○ | ○ | X |
| 54 | ○ | ○ | ○ | ○ | △ | △ | ○ | ○ | X |
| 55 | ○ | ○ | ○ | ○ | △ | △ | ○ | ○ | X |
| 56 | ○ | ○ | ○ | ○ | △ | △ | ○ | ○ | X |
| 57 | ○ | ○ | ○ | ○ | △ | △ | ○ | ○ | X |
| 58 | ○ | ○ | ○ | ○ | △ | △ | ○ | ○ | X |
| 59 | ○ | ○ | ○ | ○ | △ | △ | ○ | ○ | X |
| 60 | ○ | ○ | ○ | ○ | △ | △ | ○ | ○ | X |
| 61 | ○ | ○ | ○ | ○ | △ | △ | ○ | ○ | X |
| 62 | ○ | ○ | ○ | ○ | △ | △ | ○ | ○ | X |
| 63 | ○ | ○ | ○ | ○ | △ | △ | ○ | ○ | X |
| 64 | ○ | ○ | ○ | ○ | △ | △ | ○ | ○ | X |

(Aniline Point of Refrigerant Oil)

The results are shown in Table 6. Only the refrigerant oil I had an aniline point at 80° C., and a definite difference from the polyol ester and polyvinyl ether refrigerant oils was confirmed.

TABLE 6

| Refrigerant oil | Evaluation |
|---|---|
| A | ○ |
| B | ○ |
| C | ○ |
| D | ○ |
| E | ○ |
| F | ○ |
| G | ○ |
| H | ○ |
| I | X |

(Weight Change by Immersion Test)

The results are shown in Tables 7 and 8. A weight change occurred only in the refrigerant oil I having no aniline point at from −100 to 0° C., and a definite difference from the polyol ester and polyvinyl ether refrigerant oils was confirmed. However, no remarkable difference among the types of the working fluid was confirmed, and the same result as the working fluid 11 (R-410A) which is a commercially available composition was obtained.

TABLE 7

| Working fluid | Refrigerant oil | | | | | | | | |
|---|---|---|---|---|---|---|---|---|---|
| | A | B | C | D | E | F | G | H | I |
| 1 | ○ | ○ | ○ | ○ | ○ | ○ | ○ | ○ | X |
| 2 | ○ | ○ | ○ | ○ | ○ | ○ | ○ | ○ | X |
| 3 | ○ | ○ | ○ | ○ | ○ | ○ | ○ | ○ | X |
| 4 | ○ | ○ | ○ | ○ | ○ | ○ | ○ | ○ | X |
| 5 | ○ | ○ | ○ | ○ | ○ | ○ | ○ | ○ | X |
| 6 | ○ | ○ | ○ | ○ | ○ | ○ | ○ | ○ | X |
| 7 | ○ | ○ | ○ | ○ | ○ | ○ | ○ | ○ | X |
| 8 | ○ | ○ | ○ | ○ | ○ | ○ | ○ | ○ | X |
| 9 | ○ | ○ | ○ | ○ | ○ | ○ | ○ | ○ | X |
| 10 | ○ | ○ | ○ | ○ | ○ | ○ | ○ | ○ | X |
| 11 | ○ | ○ | ○ | ○ | ○ | ○ | ○ | ○ | X |
| 12 | ○ | ○ | ○ | ○ | ○ | ○ | ○ | ○ | X |
| 13 | ○ | ○ | ○ | ○ | ○ | ○ | ○ | ○ | X |
| 14 | ○ | ○ | ○ | ○ | ○ | ○ | ○ | ○ | X |
| 15 | ○ | ○ | ○ | ○ | ○ | ○ | ○ | ○ | X |
| 16 | ○ | ○ | ○ | ○ | ○ | ○ | ○ | ○ | X |
| 17 | ○ | ○ | ○ | ○ | ○ | ○ | ○ | ○ | X |
| 18 | ○ | ○ | ○ | ○ | ○ | ○ | ○ | ○ | X |
| 19 | ○ | ○ | ○ | ○ | ○ | ○ | ○ | ○ | X |
| 20 | ○ | ○ | ○ | ○ | ○ | ○ | ○ | ○ | X |
| 21 | ○ | ○ | ○ | ○ | ○ | ○ | ○ | ○ | X |
| 22 | ○ | ○ | ○ | ○ | ○ | ○ | ○ | ○ | X |
| 23 | ○ | ○ | ○ | ○ | ○ | ○ | ○ | ○ | X |
| 24 | ○ | ○ | ○ | ○ | ○ | ○ | ○ | ○ | X |
| 25 | ○ | ○ | ○ | ○ | ○ | ○ | ○ | ○ | X |
| 26 | ○ | ○ | ○ | ○ | ○ | ○ | ○ | ○ | X |
| 27 | ○ | ○ | ○ | ○ | ○ | ○ | ○ | ○ | X |
| 28 | ○ | ○ | ○ | ○ | ○ | ○ | ○ | ○ | X |

TABLE 7-continued

| Working fluid | Refrigerant oil | | | | | | | | |
|---|---|---|---|---|---|---|---|---|---|
| | A | B | C | D | E | F | G | H | I |
| 29 | ○ | ○ | ○ | ○ | ○ | ○ | ○ | ○ | X |
| 30 | ○ | ○ | ○ | ○ | ○ | ○ | ○ | ○ | X |
| 31 | ○ | ○ | ○ | ○ | ○ | ○ | ○ | ○ | X |
| 32 | ○ | ○ | ○ | ○ | ○ | ○ | ○ | ○ | X |

TABLE 8

| Working fluid | Refrigerant oil | | | | | | | | |
|---|---|---|---|---|---|---|---|---|---|
| | A | B | C | D | E | F | G | H | I |
| 33 | ○ | ○ | ○ | ○ | ○ | ○ | ○ | ○ | X |
| 34 | ○ | ○ | ○ | ○ | ○ | ○ | ○ | ○ | X |
| 35 | ○ | ○ | ○ | ○ | ○ | ○ | ○ | ○ | X |
| 36 | ○ | ○ | ○ | ○ | ○ | ○ | ○ | ○ | X |
| 37 | ○ | ○ | ○ | ○ | ○ | ○ | ○ | ○ | X |
| 38 | ○ | ○ | ○ | ○ | ○ | ○ | ○ | ○ | X |
| 39 | ○ | ○ | ○ | ○ | ○ | ○ | ○ | ○ | X |
| 40 | ○ | ○ | ○ | ○ | ○ | ○ | ○ | ○ | X |
| 41 | ○ | ○ | ○ | ○ | ○ | ○ | ○ | ○ | X |
| 42 | ○ | ○ | ○ | ○ | ○ | ○ | ○ | ○ | X |
| 43 | ○ | ○ | ○ | ○ | ○ | ○ | ○ | ○ | X |
| 44 | ○ | ○ | ○ | ○ | ○ | ○ | ○ | ○ | X |
| 45 | ○ | ○ | ○ | ○ | ○ | ○ | ○ | ○ | X |
| 46 | ○ | ○ | ○ | ○ | ○ | ○ | ○ | ○ | X |
| 47 | ○ | ○ | ○ | ○ | ○ | ○ | ○ | ○ | X |
| 48 | ○ | ○ | ○ | ○ | ○ | ○ | ○ | ○ | X |
| 49 | ○ | ○ | ○ | ○ | ○ | ○ | ○ | ○ | X |
| 50 | ○ | ○ | ○ | ○ | ○ | ○ | ○ | ○ | X |
| 51 | ○ | ○ | ○ | ○ | ○ | ○ | ○ | ○ | X |
| 52 | ○ | ○ | ○ | ○ | ○ | ○ | ○ | ○ | X |
| 53 | ○ | ○ | ○ | ○ | ○ | ○ | ○ | ○ | X |
| 54 | ○ | ○ | ○ | ○ | ○ | ○ | ○ | ○ | X |
| 55 | ○ | ○ | ○ | ○ | ○ | ○ | ○ | ○ | X |
| 56 | ○ | ○ | ○ | ○ | ○ | ○ | ○ | ○ | X |
| 57 | ○ | ○ | ○ | ○ | ○ | ○ | ○ | ○ | X |
| 58 | ○ | ○ | ○ | ○ | ○ | ○ | ○ | ○ | X |
| 59 | ○ | ○ | ○ | ○ | ○ | ○ | ○ | ○ | X |
| 60 | ○ | ○ | ○ | ○ | ○ | ○ | ○ | ○ | X |
| 61 | ○ | ○ | ○ | ○ | ○ | ○ | ○ | ○ | X |
| 62 | ○ | ○ | ○ | ○ | ○ | ○ | ○ | ○ | X |
| 63 | ○ | ○ | ○ | ○ | ○ | ○ | ○ | ○ | X |
| 64 | ○ | ○ | ○ | ○ | ○ | ○ | ○ | ○ | X |

(Circulation State of Refrigerant Oil)

The results are shown in Tables 9 and 10. No sufficient flow amount was confirmed only with the refrigerant oil I, and a definite difference from the polyol ester and polyvinyl ether refrigerant oils was confirmed. However, no remarkable difference among the types of the working fluid was confirmed, and the same result as the working fluid 11 (R-410A) which is a commercially available composition was obtained. However, with the refrigerant oils E and F which had a high kinematic viscosity, even though they are polyol ester type, the circulation amount tended to be slightly small.

TABLE 9

| Working fluid | Refrigerant oil | | | | | | | | |
|---|---|---|---|---|---|---|---|---|---|
| | A | B | C | D | E | F | G | H | I |
| 1 | ○ | ○ | ○ | ○ | Δ | Δ | ○ | ○ | X |
| 2 | ○ | ○ | ○ | ○ | Δ | Δ | ○ | ○ | X |
| 3 | ○ | ○ | ○ | ○ | Δ | Δ | ○ | ○ | X |
| 4 | ○ | ○ | ○ | ○ | Δ | Δ | ○ | ○ | X |
| 5 | ○ | ○ | ○ | ○ | Δ | Δ | ○ | ○ | X |
| 6 | ○ | ○ | ○ | ○ | Δ | Δ | ○ | ○ | X |
| 7 | ○ | ○ | ○ | ○ | Δ | Δ | ○ | ○ | X |
| 8 | ○ | ○ | ○ | ○ | Δ | Δ | ○ | ○ | X |
| 9 | ○ | ○ | ○ | ○ | Δ | Δ | ○ | ○ | X |
| 10 | ○ | ○ | ○ | ○ | Δ | Δ | ○ | ○ | X |
| 11 | ○ | ○ | ○ | ○ | Δ | Δ | ○ | ○ | X |
| 12 | ○ | ○ | ○ | ○ | Δ | Δ | ○ | ○ | X |
| 13 | ○ | ○ | ○ | ○ | Δ | Δ | ○ | ○ | X |
| 14 | ○ | ○ | ○ | ○ | Δ | Δ | ○ | ○ | X |
| 15 | ○ | ○ | ○ | ○ | Δ | Δ | ○ | ○ | X |
| 16 | ○ | ○ | ○ | ○ | Δ | Δ | ○ | ○ | X |
| 17 | ○ | ○ | ○ | ○ | Δ | Δ | ○ | ○ | X |
| 18 | ○ | ○ | ○ | ○ | Δ | Δ | ○ | ○ | X |
| 19 | ○ | ○ | ○ | ○ | Δ | Δ | ○ | ○ | X |
| 20 | ○ | ○ | ○ | ○ | Δ | Δ | ○ | ○ | X |
| 21 | ○ | ○ | ○ | ○ | Δ | Δ | ○ | ○ | X |
| 22 | ○ | ○ | ○ | ○ | Δ | Δ | ○ | ○ | X |
| 23 | ○ | ○ | ○ | ○ | Δ | Δ | ○ | ○ | X |
| 24 | ○ | ○ | ○ | ○ | Δ | Δ | ○ | ○ | X |
| 25 | ○ | ○ | ○ | ○ | Δ | Δ | ○ | ○ | X |
| 26 | ○ | ○ | ○ | ○ | Δ | Δ | ○ | ○ | X |
| 27 | ○ | ○ | ○ | ○ | Δ | Δ | ○ | ○ | X |
| 28 | ○ | ○ | ○ | ○ | Δ | Δ | ○ | ○ | X |
| 29 | ○ | ○ | ○ | ○ | Δ | Δ | ○ | ○ | X |
| 30 | ○ | ○ | ○ | ○ | Δ | Δ | ○ | ○ | X |
| 31 | ○ | ○ | ○ | ○ | Δ | Δ | ○ | ○ | X |
| 32 | ○ | ○ | ○ | ○ | Δ | Δ | ○ | ○ | X |

TABLE 10

| Working fluid | Refrigerant oil | | | | | | | | |
|---|---|---|---|---|---|---|---|---|---|
| | A | B | C | D | E | F | G | H | I |
| 33 | ○ | ○ | ○ | ○ | Δ | Δ | ○ | ○ | X |
| 34 | ○ | ○ | ○ | ○ | Δ | Δ | ○ | ○ | X |
| 35 | ○ | ○ | ○ | ○ | Δ | Δ | ○ | ○ | X |
| 36 | ○ | ○ | ○ | ○ | Δ | Δ | ○ | ○ | X |
| 37 | ○ | ○ | ○ | ○ | Δ | Δ | ○ | ○ | X |
| 38 | ○ | ○ | ○ | ○ | Δ | Δ | ○ | ○ | X |
| 39 | ○ | ○ | ○ | ○ | Δ | Δ | ○ | ○ | X |
| 40 | ○ | ○ | ○ | ○ | Δ | Δ | ○ | ○ | X |
| 41 | ○ | ○ | ○ | ○ | Δ | Δ | ○ | ○ | X |
| 42 | ○ | ○ | ○ | ○ | Δ | Δ | ○ | ○ | X |
| 43 | ○ | ○ | ○ | ○ | Δ | Δ | ○ | ○ | X |
| 44 | ○ | ○ | ○ | ○ | Δ | Δ | ○ | ○ | X |
| 45 | ○ | ○ | ○ | ○ | Δ | Δ | ○ | ○ | X |
| 46 | ○ | ○ | ○ | ○ | Δ | Δ | ○ | ○ | X |
| 47 | ○ | ○ | ○ | ○ | Δ | Δ | ○ | ○ | X |
| 48 | ○ | ○ | ○ | ○ | Δ | Δ | ○ | ○ | X |
| 49 | ○ | ○ | ○ | ○ | Δ | Δ | ○ | ○ | X |
| 50 | ○ | ○ | ○ | ○ | Δ | Δ | ○ | ○ | X |
| 51 | ○ | ○ | ○ | ○ | Δ | Δ | ○ | ○ | X |
| 52 | ○ | ○ | ○ | ○ | Δ | Δ | ○ | ○ | X |
| 53 | ○ | ○ | ○ | ○ | Δ | Δ | ○ | ○ | X |
| 54 | ○ | ○ | ○ | ○ | Δ | Δ | ○ | ○ | X |
| 55 | ○ | ○ | ○ | ○ | Δ | Δ | ○ | ○ | X |
| 56 | ○ | ○ | ○ | ○ | Δ | Δ | ○ | ○ | X |
| 57 | ○ | ○ | ○ | ○ | Δ | Δ | ○ | ○ | X |
| 58 | ○ | ○ | ○ | ○ | Δ | Δ | ○ | ○ | X |
| 59 | ○ | ○ | ○ | ○ | Δ | Δ | ○ | ○ | X |
| 60 | ○ | ○ | ○ | ○ | Δ | Δ | ○ | ○ | X |
| 61 | ○ | ○ | ○ | ○ | Δ | Δ | ○ | ○ | X |
| 62 | ○ | ○ | ○ | ○ | Δ | Δ | ○ | ○ | X |
| 63 | ○ | ○ | ○ | ○ | Δ | Δ | ○ | ○ | X |
| 64 | ○ | ○ | ○ | ○ | Δ | Δ | ○ | ○ | X |

[Stability Test]

The stability test was conducted on the refrigerant oils except for the refrigerant oil I with which no sufficient flow amount could be maintained.

(Hue of Refrigerant Oil)

The results are shown in Tables 11 and 12. Favorable results were obtained with respect to all the combinations of the working fluids except for the working fluid 11 (R-410A) and the refrigerant oils A, C to E and G to H. A remarkable progress of coloring was confirmed with respect to the combinations with the refrigerant oils B and F.

TABLE 11

| Working fluid | Refrigerant oil | | | | | | | |
|---|---|---|---|---|---|---|---|---|
| | A | B | C | D | E | F | G | H |
| 1 | ○ | X | ○ | ○ | ○ | X | ○ | ○ |
| 2 | ○ | X | ○ | ○ | ○ | X | ○ | ○ |
| 3 | ○ | X | ○ | ○ | ○ | X | ○ | ○ |
| 4 | ○ | X | ○ | ○ | ○ | X | ○ | ○ |
| 5 | ○ | X | ○ | ○ | ○ | X | ○ | ○ |
| 6 | ○ | X | ○ | ○ | ○ | X | ○ | ○ |
| 7 | ○ | X | ○ | ○ | ○ | X | ○ | ○ |
| 8 | ○ | X | ○ | ○ | ○ | X | ○ | ○ |
| 9 | ○ | X | ○ | ○ | ○ | X | ○ | ○ |
| 10 | ○ | X | ○ | ○ | ○ | X | ○ | ○ |
| 11 | ○ | ○ | ○ | ○ | ○ | ○ | ○ | ○ |
| 12 | ○ | X | ○ | ○ | ○ | X | ○ | ○ |
| 13 | ○ | X | ○ | ○ | ○ | X | ○ | ○ |
| 14 | ○ | X | ○ | ○ | ○ | X | ○ | ○ |
| 15 | ○ | X | ○ | ○ | ○ | X | ○ | ○ |
| 16 | ○ | X | ○ | ○ | ○ | X | ○ | ○ |
| 17 | ○ | X | ○ | ○ | ○ | X | ○ | ○ |
| 18 | ○ | X | ○ | ○ | ○ | X | ○ | ○ |
| 19 | ○ | X | ○ | ○ | ○ | X | ○ | ○ |
| 20 | ○ | X | ○ | ○ | ○ | X | ○ | ○ |
| 21 | ○ | X | ○ | ○ | ○ | X | ○ | ○ |
| 22 | ○ | X | ○ | ○ | ○ | X | ○ | ○ |
| 23 | ○ | X | ○ | ○ | ○ | X | ○ | ○ |
| 24 | ○ | X | ○ | ○ | ○ | X | ○ | ○ |
| 25 | ○ | X | ○ | ○ | ○ | X | ○ | ○ |
| 26 | ○ | X | ○ | ○ | ○ | X | ○ | ○ |
| 27 | ○ | X | ○ | ○ | ○ | X | ○ | ○ |
| 28 | ○ | X | ○ | ○ | ○ | X | ○ | ○ |
| 29 | ○ | X | ○ | ○ | ○ | X | ○ | ○ |
| 30 | ○ | X | ○ | ○ | ○ | X | ○ | ○ |
| 31 | ○ | X | ○ | ○ | ○ | X | ○ | ○ |
| 32 | ○ | X | ○ | ○ | ○ | X | ○ | ○ |

TABLE 12

| Working fluid | Refrigerant oil | | | | | | | |
|---|---|---|---|---|---|---|---|---|
| | A | B | C | D | E | F | G | H |
| 33 | ○ | X | ○ | ○ | ○ | X | ○ | ○ |
| 34 | ○ | X | ○ | ○ | ○ | X | ○ | ○ |
| 35 | ○ | X | ○ | ○ | ○ | X | ○ | ○ |
| 36 | ○ | X | ○ | ○ | ○ | X | ○ | ○ |
| 37 | ○ | X | ○ | ○ | ○ | X | ○ | ○ |
| 38 | ○ | X | ○ | ○ | ○ | X | ○ | ○ |
| 39 | ○ | X | ○ | ○ | ○ | X | ○ | ○ |
| 40 | ○ | X | ○ | ○ | ○ | X | ○ | ○ |
| 41 | ○ | X | ○ | ○ | ○ | X | ○ | ○ |
| 42 | ○ | X | ○ | ○ | ○ | X | ○ | ○ |
| 43 | ○ | X | ○ | ○ | ○ | X | ○ | ○ |
| 44 | ○ | X | ○ | ○ | ○ | X | ○ | ○ |
| 45 | ○ | X | ○ | ○ | ○ | X | ○ | ○ |
| 46 | ○ | X | ○ | ○ | ○ | X | ○ | ○ |
| 47 | ○ | X | ○ | ○ | ○ | X | ○ | ○ |
| 48 | ○ | X | ○ | ○ | ○ | X | ○ | ○ |
| 49 | ○ | X | ○ | ○ | ○ | X | ○ | ○ |
| 50 | ○ | X | ○ | ○ | ○ | X | ○ | ○ |
| 51 | ○ | X | ○ | ○ | ○ | X | ○ | ○ |
| 52 | ○ | X | ○ | ○ | ○ | X | ○ | ○ |
| 53 | ○ | X | ○ | ○ | ○ | X | ○ | ○ |
| 54 | ○ | X | ○ | ○ | ○ | X | ○ | ○ |
| 55 | ○ | X | ○ | ○ | ○ | X | ○ | ○ |
| 56 | ○ | X | ○ | ○ | ○ | X | ○ | ○ |
| 57 | ○ | X | ○ | ○ | ○ | X | ○ | ○ |
| 58 | ○ | X | ○ | ○ | ○ | X | ○ | ○ |
| 59 | ○ | X | ○ | ○ | ○ | X | ○ | ○ |
| 60 | ○ | X | ○ | ○ | ○ | X | ○ | ○ |
| 61 | ○ | X | ○ | ○ | ○ | X | ○ | ○ |
| 62 | ○ | X | ○ | ○ | ○ | X | ○ | ○ |
| 63 | ○ | X | ○ | ○ | ○ | X | ○ | ○ |
| 64 | ○ | X | ○ | ○ | ○ | X | ○ | ○ |

(Change of Outer Appearance of Catalyst)

The results are shown in Tables 13 and 14. In the same manner as the hue test, favorable results were obtained with respect to all the combinations of the working fluids except for the working fluid 11 (R-410A) and the refrigerant oils A, C to E and G to H. A remarkable change of the outer appearance of the catalyst was confirmed with respect to the combinations with the refrigerant oils B and F.

TABLE 13

| Refrigerant | Refrigerant oil | | | | | | | |
|---|---|---|---|---|---|---|---|---|
| | A | B | C | D | E | F | G | H |
| 1 | ○ | X | ○ | ○ | ○ | X | ○ | ○ |
| 2 | ○ | X | ○ | ○ | ○ | X | ○ | ○ |
| 3 | ○ | X | ○ | ○ | ○ | X | ○ | ○ |
| 4 | ○ | X | ○ | ○ | ○ | X | ○ | ○ |
| 5 | ○ | X | ○ | ○ | ○ | X | ○ | ○ |
| 6 | ○ | X | ○ | ○ | ○ | X | ○ | ○ |
| 7 | ○ | X | ○ | ○ | ○ | X | ○ | ○ |
| 8 | ○ | X | ○ | ○ | ○ | X | ○ | ○ |
| 9 | ○ | X | ○ | ○ | ○ | X | ○ | ○ |
| 10 | ○ | X | ○ | ○ | ○ | X | ○ | ○ |
| 11 | ○ | ○ | ○ | ○ | ○ | ○ | ○ | ○ |
| 12 | ○ | X | ○ | ○ | ○ | X | ○ | ○ |
| 13 | ○ | X | ○ | ○ | ○ | X | ○ | ○ |
| 14 | ○ | X | ○ | ○ | ○ | X | ○ | ○ |
| 15 | ○ | X | ○ | ○ | ○ | X | ○ | ○ |
| 16 | ○ | X | ○ | ○ | ○ | X | ○ | ○ |
| 17 | ○ | X | ○ | ○ | ○ | X | ○ | ○ |
| 18 | ○ | X | ○ | ○ | ○ | X | ○ | ○ |
| 19 | ○ | X | ○ | ○ | ○ | X | ○ | ○ |
| 20 | ○ | X | ○ | ○ | ○ | X | ○ | ○ |
| 21 | ○ | X | ○ | ○ | ○ | X | ○ | ○ |
| 22 | ○ | X | ○ | ○ | ○ | X | ○ | ○ |
| 23 | ○ | X | ○ | ○ | ○ | X | ○ | ○ |
| 24 | ○ | X | ○ | ○ | ○ | X | ○ | ○ |
| 25 | ○ | X | ○ | ○ | ○ | X | ○ | ○ |
| 26 | ○ | X | ○ | ○ | ○ | X | ○ | ○ |
| 27 | ○ | X | ○ | ○ | ○ | X | ○ | ○ |
| 28 | ○ | X | ○ | ○ | ○ | X | ○ | ○ |
| 29 | ○ | X | ○ | ○ | ○ | X | ○ | ○ |
| 30 | ○ | X | ○ | ○ | ○ | X | ○ | ○ |
| 31 | ○ | X | ○ | ○ | ○ | X | ○ | ○ |
| 32 | ○ | X | ○ | ○ | ○ | X | ○ | ○ |

TABLE 14

| Refrigerant | Refrigerant oil | | | | | | | |
|---|---|---|---|---|---|---|---|---|
| | A | B | C | D | E | F | G | H |
| 33 | ○ | X | ○ | ○ | ○ | X | ○ | ○ |
| 34 | ○ | X | ○ | ○ | ○ | X | ○ | ○ |
| 35 | ○ | X | ○ | ○ | ○ | X | ○ | ○ |
| 36 | ○ | X | ○ | ○ | ○ | X | ○ | ○ |
| 37 | ○ | X | ○ | ○ | ○ | X | ○ | ○ |
| 38 | ○ | X | ○ | ○ | ○ | X | ○ | ○ |
| 39 | ○ | X | ○ | ○ | ○ | X | ○ | ○ |
| 40 | ○ | X | ○ | ○ | ○ | X | ○ | ○ |
| 41 | ○ | X | ○ | ○ | ○ | X | ○ | ○ |
| 42 | ○ | X | ○ | ○ | ○ | X | ○ | ○ |
| 43 | ○ | X | ○ | ○ | ○ | X | ○ | ○ |
| 44 | ○ | X | ○ | ○ | ○ | X | ○ | ○ |

TABLE 14-continued

| Refrigerant | A | B | C | D | E | F | G | H |
|---|---|---|---|---|---|---|---|---|
| 45 | ○ | X | ○ | ○ | ○ | X | ○ | ○ |
| 46 | ○ | X | ○ | ○ | ○ | X | ○ | ○ |
| 47 | ○ | X | ○ | ○ | ○ | X | ○ | ○ |
| 48 | ○ | X | ○ | ○ | ○ | X | ○ | ○ |
| 49 | ○ | X | ○ | ○ | ○ | X | ○ | ○ |
| 50 | ○ | X | ○ | ○ | ○ | X | ○ | ○ |
| 51 | ○ | X | ○ | ○ | ○ | X | ○ | ○ |
| 52 | ○ | X | ○ | ○ | ○ | X | ○ | ○ |
| 53 | ○ | X | ○ | ○ | ○ | X | ○ | ○ |
| 54 | ○ | X | ○ | ○ | ○ | X | ○ | ○ |
| 55 | ○ | X | ○ | ○ | ○ | X | ○ | ○ |
| 56 | ○ | X | ○ | ○ | ○ | X | ○ | ○ |
| 57 | ○ | X | ○ | ○ | ○ | X | ○ | ○ |
| 58 | ○ | X | ○ | ○ | ○ | X | ○ | ○ |
| 59 | ○ | X | ○ | ○ | ○ | X | ○ | ○ |
| 60 | ○ | X | ○ | ○ | ○ | X | ○ | ○ |
| 61 | ○ | X | ○ | ○ | ○ | X | ○ | ○ |
| 62 | ○ | X | ○ | ○ | ○ | X | ○ | ○ |
| 63 | ○ | X | ○ | ○ | ○ | X | ○ | ○ |
| 64 | ○ | X | ○ | ○ | ○ | X | ○ | ○ |

(Sludge)

The results are shown in Tables 15 and 16. In the same manner as the hue test, favorable results were obtained with respect to all the combinations of the working fluids except for the working fluid 11 (R-410A) and the refrigerant oils A, C to E and G to H. A remarkable sludge was confirmed with respect to the combinations with the refrigerant oils B and F.

TABLE 15

| Working fluid | A | B | C | D | E | F | G | H |
|---|---|---|---|---|---|---|---|---|
| 1 | ○ | X | ○ | ○ | ○ | X | ○ | ○ |
| 2 | ○ | X | ○ | ○ | ○ | X | ○ | ○ |
| 3 | ○ | X | ○ | ○ | ○ | X | ○ | ○ |
| 4 | ○ | X | ○ | ○ | ○ | X | ○ | ○ |
| 5 | ○ | X | ○ | ○ | ○ | X | ○ | ○ |
| 6 | ○ | X | ○ | ○ | ○ | X | ○ | ○ |
| 7 | ○ | X | ○ | ○ | ○ | X | ○ | ○ |
| 8 | ○ | X | ○ | ○ | ○ | X | ○ | ○ |
| 9 | ○ | X | ○ | ○ | ○ | X | ○ | ○ |
| 10 | ○ | X | ○ | ○ | ○ | X | ○ | ○ |
| 11 | ○ | ○ | ○ | ○ | ○ | ○ | ○ | ○ |
| 12 | ○ | X | ○ | ○ | ○ | X | ○ | ○ |
| 13 | ○ | X | ○ | ○ | ○ | X | ○ | ○ |
| 14 | ○ | X | ○ | ○ | ○ | X | ○ | ○ |
| 15 | ○ | X | ○ | ○ | ○ | X | ○ | ○ |
| 16 | ○ | X | ○ | ○ | ○ | X | ○ | ○ |
| 17 | ○ | X | ○ | ○ | ○ | X | ○ | ○ |
| 18 | ○ | X | ○ | ○ | ○ | X | ○ | ○ |
| 19 | ○ | X | ○ | ○ | ○ | X | ○ | ○ |
| 20 | ○ | X | ○ | ○ | ○ | X | ○ | ○ |
| 21 | ○ | X | ○ | ○ | ○ | X | ○ | ○ |
| 22 | ○ | X | ○ | ○ | ○ | X | ○ | ○ |
| 23 | ○ | X | ○ | ○ | ○ | X | ○ | ○ |
| 24 | ○ | X | ○ | ○ | ○ | X | ○ | ○ |
| 25 | ○ | X | ○ | ○ | ○ | X | ○ | ○ |
| 26 | ○ | X | ○ | ○ | ○ | X | ○ | ○ |
| 27 | ○ | X | ○ | ○ | ○ | X | ○ | ○ |
| 28 | ○ | X | ○ | ○ | ○ | X | ○ | ○ |
| 29 | ○ | X | ○ | ○ | ○ | X | ○ | ○ |
| 30 | ○ | X | ○ | ○ | ○ | X | ○ | ○ |
| 31 | ○ | X | ○ | ○ | ○ | X | ○ | ○ |
| 32 | ○ | X | ○ | ○ | ○ | X | ○ | ○ |

TABLE 16

| Working fluid | A | B | C | D | E | F | G | H |
|---|---|---|---|---|---|---|---|---|
| 33 | ○ | X | ○ | ○ | ○ | X | ○ | ○ |
| 34 | ○ | X | ○ | ○ | ○ | X | ○ | ○ |
| 35 | ○ | X | ○ | ○ | ○ | X | ○ | ○ |
| 36 | ○ | X | ○ | ○ | ○ | X | ○ | ○ |
| 37 | ○ | X | ○ | ○ | ○ | X | ○ | ○ |
| 38 | ○ | X | ○ | ○ | ○ | X | ○ | ○ |
| 39 | ○ | X | ○ | ○ | ○ | X | ○ | ○ |
| 40 | ○ | X | ○ | ○ | ○ | X | ○ | ○ |
| 41 | ○ | X | ○ | ○ | ○ | X | ○ | ○ |
| 42 | ○ | X | ○ | ○ | ○ | X | ○ | ○ |
| 43 | ○ | X | ○ | ○ | ○ | X | ○ | ○ |
| 44 | ○ | X | ○ | ○ | ○ | X | ○ | ○ |
| 45 | ○ | X | ○ | ○ | ○ | X | ○ | ○ |
| 46 | ○ | X | ○ | ○ | ○ | X | ○ | ○ |
| 47 | ○ | X | ○ | ○ | ○ | X | ○ | ○ |
| 48 | ○ | X | ○ | ○ | ○ | X | ○ | ○ |
| 49 | ○ | X | ○ | ○ | ○ | X | ○ | ○ |
| 50 | ○ | X | ○ | ○ | ○ | X | ○ | ○ |
| 51 | ○ | X | ○ | ○ | ○ | X | ○ | ○ |
| 52 | ○ | X | ○ | ○ | ○ | X | ○ | ○ |
| 53 | ○ | X | ○ | ○ | ○ | X | ○ | ○ |
| 54 | ○ | X | ○ | ○ | ○ | X | ○ | ○ |
| 55 | ○ | X | ○ | ○ | ○ | X | ○ | ○ |
| 56 | ○ | X | ○ | ○ | ○ | X | ○ | ○ |
| 57 | ○ | X | ○ | ○ | ○ | X | ○ | ○ |
| 58 | ○ | X | ○ | ○ | ○ | X | ○ | ○ |
| 59 | ○ | X | ○ | ○ | ○ | X | ○ | ○ |
| 60 | ○ | X | ○ | ○ | ○ | X | ○ | ○ |
| 61 | ○ | X | ○ | ○ | ○ | X | ○ | ○ |
| 62 | ○ | X | ○ | ○ | ○ | X | ○ | ○ |
| 63 | ○ | X | ○ | ○ | ○ | X | ○ | ○ |
| 64 | ○ | X | ○ | ○ | ○ | X | ○ | ○ |

CONCLUSION

It was confirmed that with the composition for a heat cycle system comprising a polyol ester or polyvinyl ether refrigerant oil having high compatibility with a working fluid containing an unsaturated fluorinated hydrocarbon compound, a sufficient circulation amount which is the same as the working fluid 11 (R-410A) which is a commercially available composition can be secured, from the results of measurement of the circulation state. However, from the results of the stability test, coloring of the refrigerant oil, discoloration of the catalyst and formation of sludge were confirmed specifically with respect to the combinations of the working fluids containing an unsaturated fluorinated hydrocarbon compound with the refrigerant oils B and F having a high hydroxy value. It is estimated that the double bond contained in the working fluids except for the working fluid 11 underwent decomposition of some kind or polymerization reaction due to hydroxy groups. Accordingly, it was confirmed that a composition for a heat cycle system having favorable properties can be obtained by using, as a refrigerant oil to be used in combination with a working fluid containing an unsaturated fluorinated hydrocarbon compound having a specific structure, a refrigerant oil having favorable compatibility with the working fluid for heat cycle and having a low hydroxy value.

Further, it was confirmed that with the composition for a heat cycle system using a polyol ester or polyvinyl ether refrigerant oil having high compatibility with a working fluid containing an unsaturated fluorinated hydrocarbon compound, and having a kinematic viscosity at 40° C. of at most 200 mm²/s, a sufficient circulation amount which is the same as the working fluid 11 (R-410A) which is a commercially available composition, can be secured, from the results of measurement of the circulation state.

It was confirmed that with a composition for a heat cycle system comprising a polyol ester or polyvinyl ether refrigerant oil having an aniline point within a range of from −100 to 0° C., the swell of the resin was small with reference to nylon-11 as an example. Further, from the results of observation of the circulation state, it was confirmed that a sufficient circulation amount which is the same as the working fluid 11 (R-410A) which is a commercially available composition can be secured.

From the above results, it is evident that all the compositions for a heat cycle system comprising each of the working fluids 1 to 10 and 12 to 64 and each of the refrigerant oils A, C to D and G to H of the present invention are in a favorable circulation state, have excellent properties also in terms of stability, and are suitable as a composition for a heat cycle system.

INDUSTRIAL APPLICABILITY

The composition for a heat cycle system and a heat cycle system employing the composition of the present invention are useful for a refrigerator (such as a built-in showcase, a separate showcase, an industrial fridge freezer, a vending machine or an ice making machine), an air-conditioning apparatus (such as a room air-conditioner, a store package air-conditioner, a building package air-conditioner, a plant package air-conditioner, a gas engine heat pump, a train air-conditioning system or an automobile air-conditioning system), power generation system (such as exhaust heat recovery power generation) or a heat transport apparatus (such as a heat pipe).

This application is a continuation of PCT Application No. PCT/JP2015/054653, filed on Feb. 19, 2015, which is based upon and claims the benefit of priority from Japanese Patent Application No. 2014-030857 filed on Feb. 20, 2014, Japanese Patent Application No. 2014-127744 filed on Jun. 20, 2014, Japanese Patent Application No. 2014-148347 filed on Jul. 18, 2014 and Japanese Patent Application No. 2014-187003 filed on Sep. 12, 2014. The contents of those applications are incorporated herein by reference in their entireties.

REFERENCE SYMBOLS

10: refrigerating cycle system, 11: compressor, 12: condenser, 13: expansion valve, 14: evaporator, 15, 16: pump

What is claimed is:
1. A composition, comprising
a working fluid for heat cycle containing difluoromethane as a saturated fluorinated hydrocarbon compound, trifluoroethylene and 2,3,3,3-tetrafluoropropene as unsaturated fluorinated hydrocarbon compounds, and optionally at least one other unsaturated fluorinated hydrocarbon compound which is a compound comprising at least one carbon-carbon unsaturated bond and represented by formula (I), and
a refrigerant oil having a breakdown voltage of at least 25 kV, a hydroxyl value of at most 0.1 mgKOH/g, and a minimum temperature on a high temperature side of a phase separation temperature from the working flui d for heat cycle of at least 35° C. and a maximum temperature on a low temperature side of at most −60° C.:

$$C_xF_yR_z \tag{I}$$

where R is H or Cl, x is an integer of from 2 to 6, y is an integer of from 1 to 12, and z is an integer of from 0 to 11, provided that $2x \geq y+z \geq 2$.

2. The composition according to claim 1, wherein the compound of the formula (I) where x is 2 or 3 is contained.

3. The composition according to claim 2, wherein the at least one other unsaturated fluorinated hydrocarbon compound selected from the group consisting of 1,2-difluoroethylene, 2-fluoropropene, 1,1,2-trifluoropropene, (E)-1,2,3,3,3-pentafluoropropene, (Z)-1,2,3,3,3-pentafluoropropene, (E)-1,3,3,3-tetrafluoropropene, (Z)-1,3,3,3-tetrafluoropropene and 3,3,3-trifluoropropene is contained.

4. The composition according to claim 1, wherein the working fluid for heat cycle further contains at least one other saturated fluorinated hydrocarbon compound.

5. The composition according to claim 4, wherein the at least one other saturated fluorinated hydrocarbon compound selected from the group consisting of trifluoromethane, difluoroethane, trifluoroethane, tetrafluoroethane, pentafluoroethane, trifluoroiodomethane, pentafluoropropane, hexafluoropropane, heptafluoropropane, pentafluorobutane and heptafluorocyclopentane is contained.

6. The composition according to claim 1, wherein a content of trifluoroethylene is from 20 to 80 mass % per 100 mass % of the working fluid.

7. The composition according to claim 1, wherein a content of difluoromethane is from 20 to 80 mass % per 100 mass % of the working fluid.

8. The composition according to claim 1, wherein
a proportion of a total amount of trifluoroethylene, 2,3,3,3-tetrafluoropropene and difluoromethane based on an entire amount of the working fluid is higher than 90 mass % and at most 100 mass %, and
based on the total amount of trifluoroethylene, 2,3,3,3-tetrafluoropropene and difluoromethane, a proportion of trifluoroethylene is at least 10 mass % and less than 70 mass %, a proportion of 2,3,3,3-tetrafluoropropene is higher than 0 mass % and at most 50 mass %, and a proportion of difluoromethane is higher than 30 mass % and at most 75 mass %.

9. The composition according to claim 1, wherein
a proportion of a total amount of trifluoroethylene, 2,3,3,3-tetrafluoropropene, and difluoromethane based on an entire amount of the working fluid for heat cycle is higher than 90 mass % and at most 100 mass %,
based on the total amount of trifluoroethylene, 2,3,3,3-tetrafluoropropene, and difluoromethane, a proportion of a total amount of trifluoroethylene and 2,3,3,3-tetrafluoropropene is at least 70 mass %, a proportion of trifluoroethylene is at least 30 mass % and at most 80 mass %, a proportion of 2,3,3,3-tetrafluoropropene is higher than 0 mass % and at most 40 mass %, and a proportion of difluoromethane is higher than 0 mass % and at most 30 mass %, and
a ratio of trifluoroethylene to 2,3,3,3-tetrafluoropropene is at most 95/5.

10. The composition according to claim 1, wherein the refrigerant oil comprises at least one of a polyol ester refrigerant oil and a polyvinyl ether refrigerant oil.

11. The composition according to claim 1, wherein the refrigerant oil has a kinematic viscosity at 40° C. of from 5 to 200 mm$^2$/s and a kinematic viscosity at 100° C. of from 1 to 100 mm$^2$/s.

12. The composition according to claim 1, wherein the refrigerant oil has an aniline point of at least −100° C. and at most 0° C.

13. A heat cycle system, comprising the composition according to claim 1.

14. The heat cycle system according to claim 13, which is at least one of a refrigerating apparatus, an air-conditioning apparatus, a power generation system, a heat transport apparatus, and a secondary cooling machine.

15. The heat cycle system according to claim 14, which comprises a compression mechanism comprising a contact portion in contact with the composition, wherein the contact portion comprises at least one of an engineering plastic, an organic film, and an inorganic film.

\* \* \* \* \*